US012572413B2

(12) United States Patent (10) Patent No.: US 12,572,413 B2
Lee et al. (45) Date of Patent: Mar. 10, 2026

(54) MEMORY CONTROLLERS AND MEMORY SYSTEMS

(71) Applicant: Samsung Electronics Co., Ltd., Suwon-si (KR)

(72) Inventors: Myungkyu Lee, Suwon-si (KR); Seongmuk Kang, Suwon-si (KR); Jiho Kim, Suwon-si (KR); Kijun Lee, Suwon-si (KR); Kyomin Sohn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 18/469,894

(22) Filed: Sep. 19, 2023

(65) Prior Publication Data

US 2024/0281323 A1 Aug. 22, 2024

(30) Foreign Application Priority Data

Feb. 17, 2023 (KR) ........................ 10-2023-0021269

(51) Int. Cl.
 G06F 11/10 (2006.01)
(52) U.S. Cl.
 CPC ................................ G06F 11/1044 (2013.01)
(58) Field of Classification Search
 CPC .. H03M 13/12; H03M 13/15; H03M 12/1575; G06F 11/1012; G06F 11/1044;
 (Continued)

(56) References Cited

U.S. PATENT DOCUMENTS 5,872,799 A 2/1999 Lee et al.
7,206,993 B2 4/2007 Senda et al.
(Continued)

FOREIGN PATENT DOCUMENTS

JP 4346396 B2 7/2009
KR 20210150149 A 12/2021

OTHER PUBLICATIONS

Lee, et al., "23.4 A 512GB 1.1V Managed DRAM Solution with 16GB ODP and Media Controller", 2019 IEEE International Solid-State Circuits Conference, San Francisco, CA, USA, 2019, 384-386.
(Continued)

*Primary Examiner* — Shelly A Chase
(74) *Attorney, Agent, or Firm* — Wolf, Greenfield & Sacks, P.C.

(57) ABSTRACT

A memory controller including a processor and configured to control a memory module including a plurality of data chips and at least one parity chip includes an error correction code (ECC) engine, the ECC engine including an ECC decoder to correct Q symbols errors in a codeword set read from the memory module, Q is a maximum natural number equal to or less than P and P is a natural number equal to or greater than four. The ECC decoder is configured to generate a syndrome including first through P-th syndrome symbols based on the read codeword set by using a parity check matrix and to perform a first ECC decoding to correct a single symbol error in the read codeword set based on the first syndrome symbol and a selected syndrome symbol corresponding to one of the second through P-th syndrome symbols.

20 Claims, 28 Drawing Sheets

(58) Field of Classification Search
  CPC ............. G06F 11/1048; G06F 11/1052; G06F
                11/1072; G06F 3/0604; G06F 3/0614;
                          G06F 3/0659; G11C 29/42
  See application file for complete search history.

(56)                    References Cited

U.S. PATENT DOCUMENTS

| | | | |
|---|---|---|---|
| 8,245,106 B2 | 8/2012 | Chen et al. | |
| 9,164,831 B2 * | 10/2015 | Horisaki ........... | H03M 13/1575 |
| 10,848,184 B2 | 11/2020 | Yang | |
| 11,108,412 B2 | 8/2021 | Shin et al. | |
| 2008/0162991 A1 * | 7/2008 | Dell .................... | G06F 11/1012 |
| | | | 714/25 |
| 2020/0210292 A1 * | 7/2020 | Kim .................... | G06F 11/1012 |
| 2021/0208967 A1 * | 7/2021 | Cha ....................... | H03M 13/13 |
| 2021/0384919 A1 | 12/2021 | Lee et al. | |

OTHER PUBLICATIONS

Pontarelli, et al., "Low Delay Single Symbol Error Correction Codes Based on Reed Solomon Codes", IEEE Transactions on Computers, 64(5), 2015, 1497-1501.

* cited by examiner

$$\underline{PCM}^{T}$$

$$\begin{bmatrix} \alpha^0 & \alpha^0 & \cdots & \alpha^0 \\ \alpha^1 & \alpha^2 & \cdots & \alpha^N \\ \alpha^2 & \alpha^4 & \cdots & \alpha^{2N} \\ \alpha^3 & \alpha^6 & \cdots & \alpha^{3N} \\ \vdots & \vdots & \cdots & \vdots \\ \alpha^{P-1} & \alpha^{2(P-1)} & \cdots & \alpha^{N(P-1)} \end{bmatrix}$$

FIG. 9

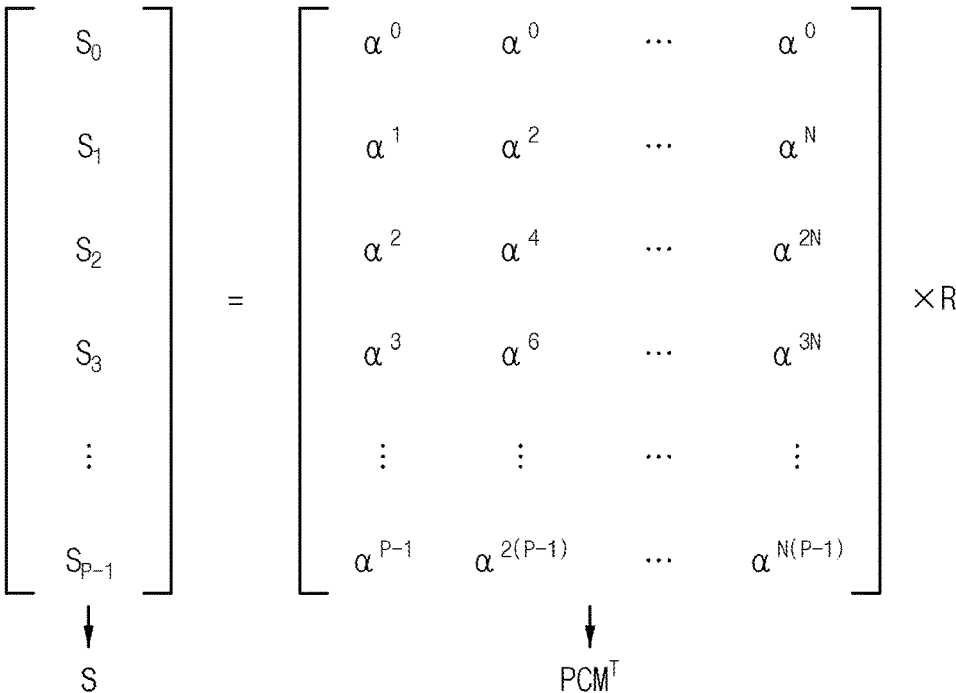

$$\begin{bmatrix} S_0 \\ S_1 \\ S_2 \\ S_3 \\ \vdots \\ S_{P-1} \end{bmatrix} = \begin{bmatrix} \alpha^0 & \alpha^0 & \cdots & \alpha^0 \\ \alpha^1 & \alpha^2 & \cdots & \alpha^N \\ \alpha^2 & \alpha^4 & \cdots & \alpha^{2N} \\ \alpha^3 & \alpha^6 & \cdots & \alpha^{3N} \\ \vdots & \vdots & \cdots & \vdots \\ \alpha^{P-1} & \alpha^{2(P-1)} & \cdots & \alpha^{N(P-1)} \end{bmatrix} \times R$$

$$\downarrow \qquad\qquad\qquad\qquad \downarrow$$
$$S \qquad\qquad\qquad\qquad PCM^T$$

FIG. 10

$$R = \{r_0, r_1, r_2, r_3, \cdots, r_{N-1}\}^{\mathsf{T}}$$

FIG. 11

$$R' = \{r_0, r_1, \cdots, r_{i-1}, r_i^{\,C}, r_{i+1}, r_{N-1}\}^{\mathsf{T}}$$

FIG. 12

$$
\begin{bmatrix}
S_0' \\
S_1' \\
S_2' \\
S_3' \\
\vdots \\
S_{P-1}'
\end{bmatrix}
=
\begin{bmatrix}
\alpha^0 & \alpha^0 & \cdots & \alpha^0 \\
\alpha^1 & \alpha^2 & \cdots & \alpha^N \\
\alpha^2 & \alpha^4 & \cdots & \alpha^{2N} \\
\alpha^3 & \alpha^6 & \cdots & \alpha^{3N} \\
\vdots & \vdots & \cdots & \vdots \\
\alpha^{P-1} & \alpha^{2(P-1)} & \cdots & \alpha^{N(P-1)}
\end{bmatrix}
\times R
$$

$$S' \qquad\qquad PCM^{\mathsf{T}}$$

FIG. 14

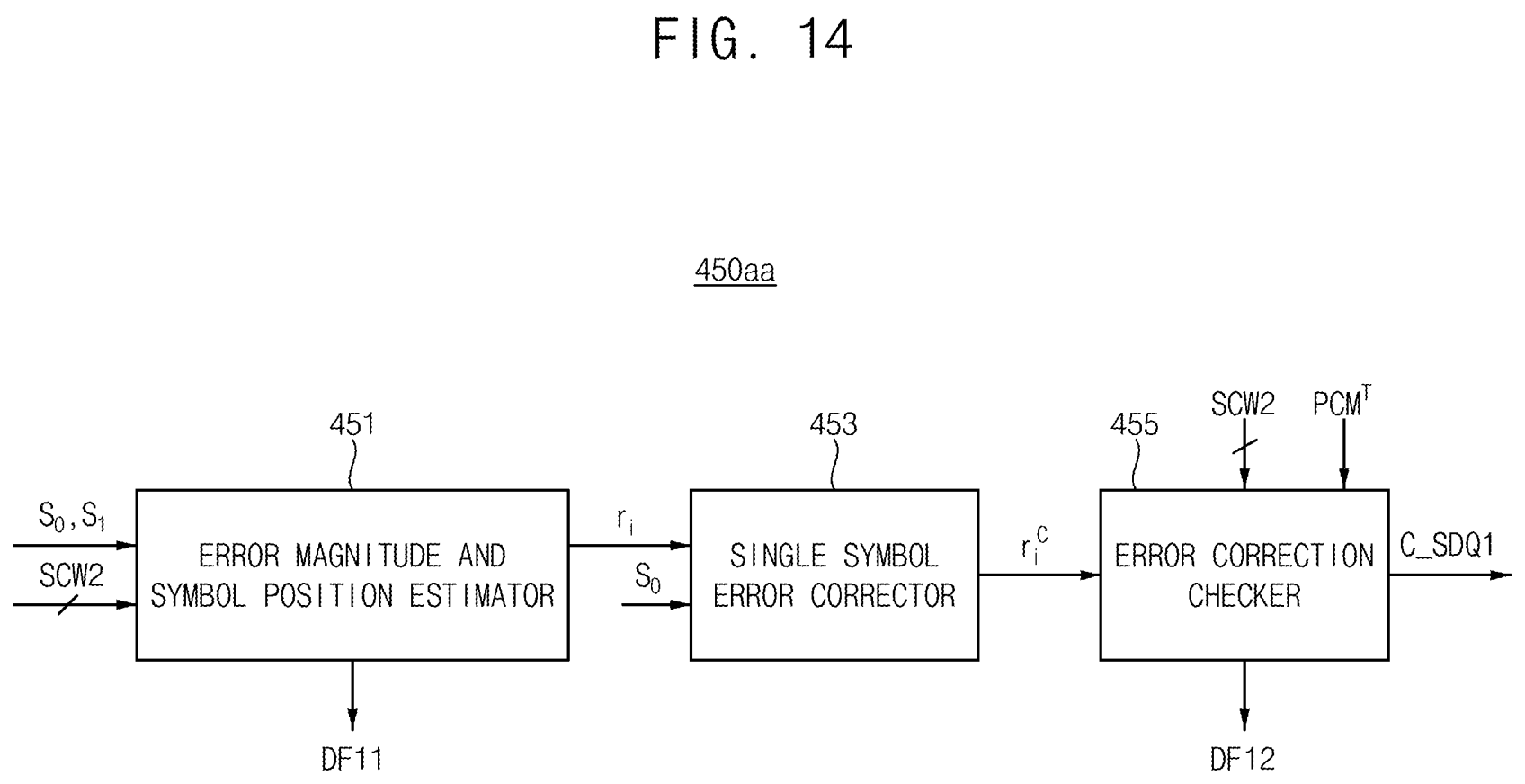

450aa $S_0, S_1$
SCW2 →

ERROR MAGNITUDE AND SYMBOL POSITION ESTIMATOR
451

→ DF11

$r_i$
$S_0$ →

SINGLE SYMBOL ERROR CORRECTOR
453

$r_i^C$ →

SCW2    $PCM^T$

ERROR CORRECTION CHECKER
455

→ C_SDQ1

GENERATE SYNDROME　　　～S110

ESTIMATE ERROR MAGNITUDE AND POSITION OF TARGET
SYMBOL BASED ON A FIRST SYNDROME SYMBOL
AND A SECOND SYNDROME SYMBOL　　　～S130

GENERATE ESTIMATED SYNDROME SYMBOLS BASED
ON THE FIRST SYNDROME SYMBOL
AND THE ESTIMATED POSITION　　　～S140

COMPARE THE ESTIMATED SYNDROME SYMBOLS
AND SECOND THROUGH P-th SYNDROME SYMBOLS　　　～S145

ORRECT SINGLE SYMBOL ERROR　　　～S155

Figure 18:
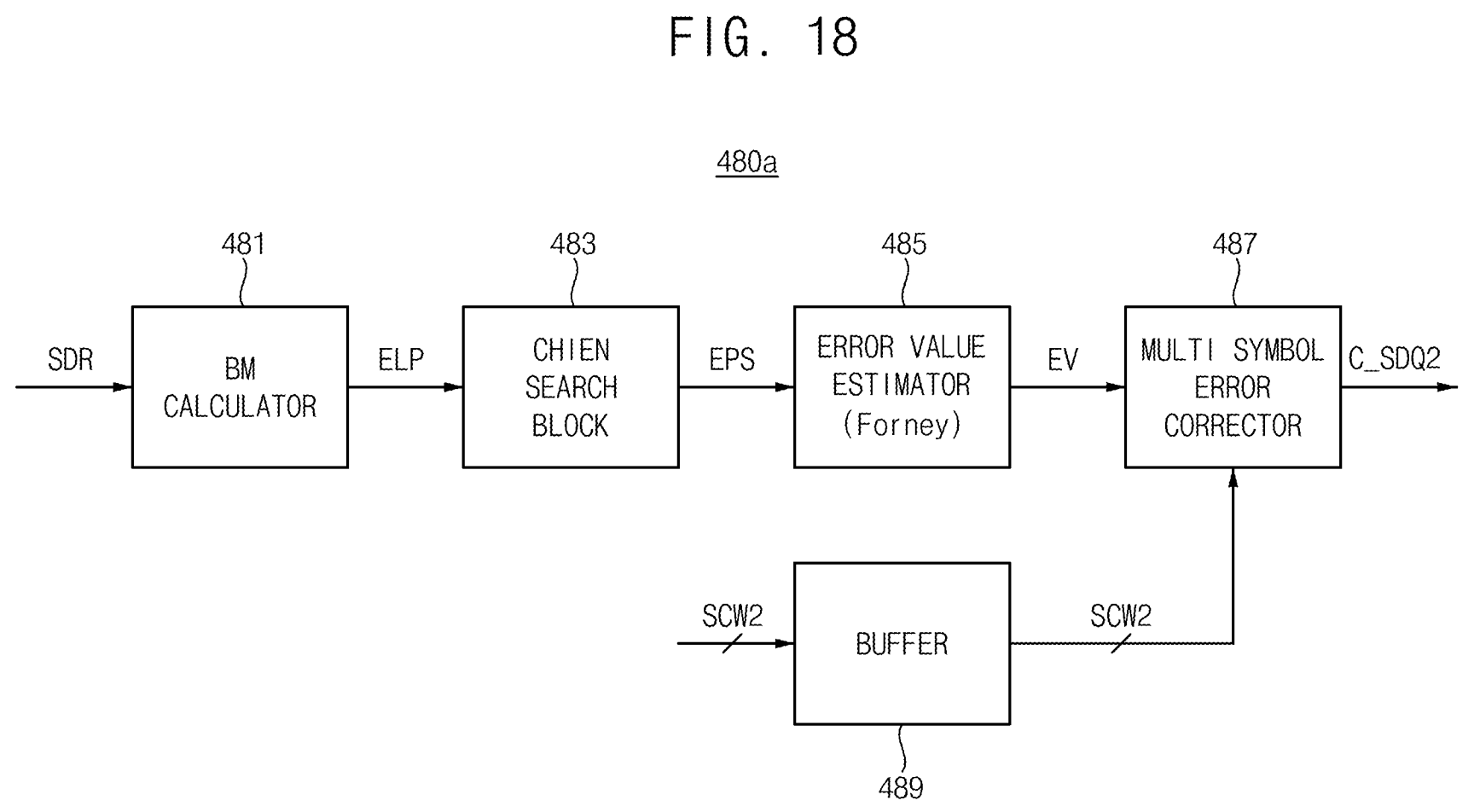

SDR → | BM CALCULATOR | 481

ELP → | CHIEN SEARCH BLOCK | 483

EPS → | ERROR VALUE ESTIMATOR (Forney) | 485

EV → | MULTI SYMBOL ERROR CORRECTOR | 487 → C_SDQ2

SCW2 → | BUFFER | 489

SCW2

Figure 22:
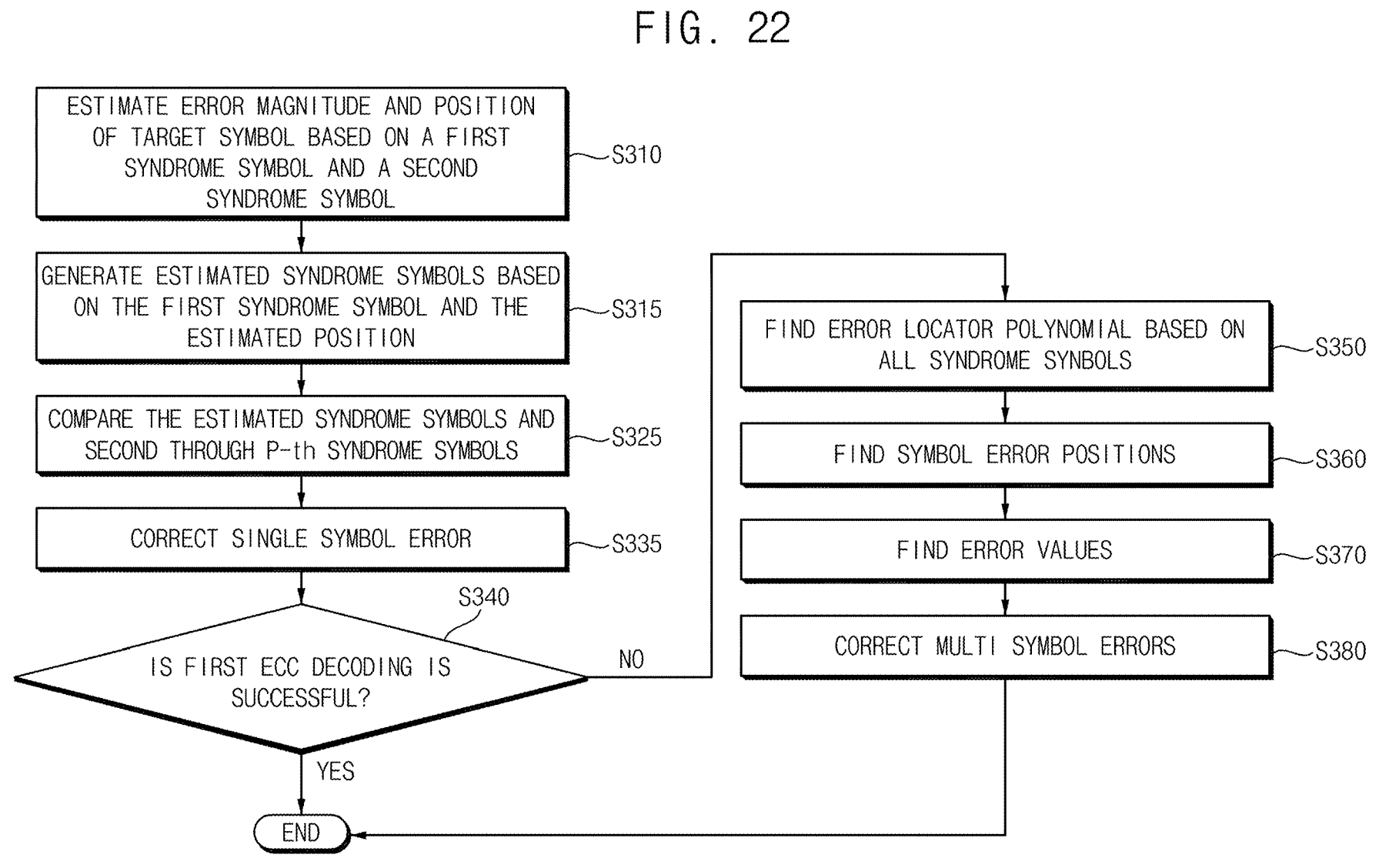

ESTIMATE ERROR MAGNITUDE AND POSITION OF TARGET SYMBOL BASED ON A FIRST SYNDROME SYMBOL AND A SECOND SYNDROME SYMBOL — S310

GENERATE ESTIMATED SYNDROME SYMBOLS BASED ON THE FIRST SYNDROME SYMBOL AND THE ESTIMATED POSITION — S315

COMPARE THE ESTIMATED SYNDROME SYMBOLS AND SECOND THROUGH P-th SYNDROME SYMBOLS — S325

CORRECT SINGLE SYMBOL ERROR — S335

IS FIRST ECC DECODING IS SUCCESSFUL? — S340

NO

FIND ERROR LOCATOR POLYNOMIAL BASED ON ALL SYNDROME SYMBOLS — S350

FIND SYMBOL ERROR POSITIONS — S360

FIND ERROR VALUES — S370

CORRECT MULTI SYMBOL ERRORS — S380

YES

END

X :Symbol error

FIG. 24

X :Symbol error

MEMORY CONTROLLERS AND MEMORY SYSTEMS

CROSS-REFERENCE TO RELATED APPLICATION

This application claims priority under 35 U.S.C. § 119 to Korean Patent Application No. 10-2023-0021269, filed on Feb. 17, 2023, in the Korean Intellectual Property Office, the disclosure of which is incorporated by reference herein in its entirety.

TECHNICAL FIELD

Example embodiments of the present disclosure relate to memories, and more particularly, to memory controllers and memory systems including the same.

BACKGROUND

A memory device may be implemented using a semiconductor, such as silicon (Si), germanium (Ge), gallium arsenide (GaAs), indium phosphide (InP), or the like. Memory devices are typically divided into volatile memory devices and nonvolatile memory devices.

A volatile memory device refers to a memory device in which stored data is lost when a power supply is shut down. Conversely, a nonvolatile memory device refers to a memory device that retains stored data when a power supply is shut down. Because a dynamic random access memory (DRAM), which is a kind of volatile memory device, has a high access speed, the DRAM is widely used as a working memory, a buffer memory, a main memory, or the like of a computing system.

In addition, a plurality of volatile memory devices may be provided in the form of memory modules for a relatively large storage capacity. Thus, research is being conducted into various ways in which errors occurring in memory modules can be efficiently corrected.

SUMMARY

Some example embodiments provide a memory controller that may facilitate the efficient correction of errors that may occur in a memory module.

Some example embodiments provide a memory system that includes a memory controller that may facilitate the efficient correction of errors that may occur in a memory module.

According to some example embodiments, a memory controller including a processor and configured to control a memory module including a plurality of data chips and at least one parity chip includes an error correction code (ECC) engine, the ECC engine including an ECC decoder configured to correct Q symbol errors in a codeword set read from the memory module, Q being a maximum natural number equal to or less than P, P being a natural number equal to or greater than four. The ECC decoder is configured to generate a syndrome including first through P-th syndrome symbols based on the read codeword set by using a parity check matrix and to perform a first ECC decoding to correct a single symbol error in the read codeword set based on the first syndrome symbol and a selected syndrome symbol corresponding to one of the second through P-th syndrome symbols.

According to some example embodiments, a memory system includes a memory module and a memory controller.

The memory module includes a plurality of data chips and at least one parity chip. The memory controller includes a processor and is configured to control the memory module. The memory controller further includes an error correction code (ECC) engine and a processor to control the ECC engine, the ECC engine including an ECC decoder to correct Q symbols errors in a codeword set read from the memory module, Q is a maximum natural number equal to or less than P and P is a natural number equal to or greater than four. The ECC decoder is configured to generate a syndrome including first through P-th syndrome symbols based on the read codeword set by using a parity check matrix, to correct a single symbol error in the read codeword set by performing a first ECC decoding to estimate an error magnitude and a position of a target symbol in which an error exists based on the first syndrome symbol and a selected syndrome symbol corresponding to one of the second through P-th syndrome symbols, to correct an error of the target symbol based on the estimated position of the target symbol, and to verify whether the error is corrected.

According to some example embodiments, a memory controller includes a processor and is configured to control a memory module including a plurality of data chips and at least one parity chip, The memory controller includes an error correction code (ECC) engine, the ECC engine including an ECC decoder to correct Q symbols errors in a codeword set read from the memory module, Q is a maximum natural number equal to or less than P and P is a natural number equal to or greater than four. The ECC decoder is configured to generate a syndrome including first through P-th syndrome symbols based on the read codeword set by using a parity check matrix, to correct a single symbol error in the read codeword set by performing an ECC decoding to estimate an error magnitude and a position of a target symbol in which an error exists based on the first syndrome symbol and a selected syndrome symbol corresponding to one of the second through P-th syndrome symbols, to correct an error of the target symbol based on the estimated position of the target symbol, and to verify whether the error is corrected.

Accordingly, the ECC decoder in the memory controller, may perform a first ECC decoding to correct a single symbol error in a read codeword set rapidly, which is read from a memory module, by using a portion of syndrome symbols and may perform a second ECC decoding to correct multi symbol errors, by using all of the syndrome symbols, in parallel with the first ECC decoding or after the first ECC decoding, when the first ECC decoding fails. Therefore, the ECC decoder, according to some embodiments, may reduce decoding latency.

BRIEF DESCRIPTION OF THE DRAWINGS

Illustrative, non-limiting example embodiments will be more clearly understood from the following detailed description taken in conjunction with the accompanying drawings.

FIG. 2 is block diagram illustrating the memory controller in the memory system of FIG. 1 according to example embodiments.

FIG. 3 illustrates data sets corresponding to the plurality of burst lengths in the memory system of FIG. 1 according to example embodiments.

FIG. 4 is a block diagram illustrating one of the data chips in the memory module of FIG. 1 according to example embodiments.

FIG. 8 illustrates a transposition matrix of the parity check matrix stored in the memory in the ECC engine of FIG. 6 according to example embodiments.

FIG. 9 illustrates a syndrome that the ECC decoder generates in the ECC engine of FIG. 6 according to example embodiments.

FIG. 10 illustrates a vector representation of the read codeword set in FIG. 9 according to example embodiments.

FIG. 11 illustrates an example that one of the plurality of read symbols is corrected in FIG. 10 according to example embodiments.

FIG. 12 illustrates an example that the ECC decoder generates a check syndrome using the corrected target symbol according to example embodiments.

FIG. 14 is a block diagram illustrating an example of the single symbol correction circuit in the ECC decoder of FIG. 13 according to example embodiments.

FIG. 16 is a block diagram illustrating an example of the single symbol correction circuit in the ECC decoder of FIG. 13 according to example embodiments.

FIG. 18 is a block diagram illustrating an example of the multi symbol correction circuit in the ECC decoder of FIG. 13 according to example embodiments.

FIG. 20 is a block diagram illustrating an example of the ECC decoder in the ECC engine of FIG. 6 according to example embodiments.

FIG. 22 illustrates an example operation of the ECC decoder of FIG. 20 according to example embodiments.

FIGS. 23 and 24 illustrate various types of errors that the ECC decoder may correct according to example embodiments.

FIG. 26 is a block diagram illustrating a memory system having quad-rank memory modules according to example embodiments.

DETAILED DESCRIPTION OF THE EMBODIMENTS

Figure 1:
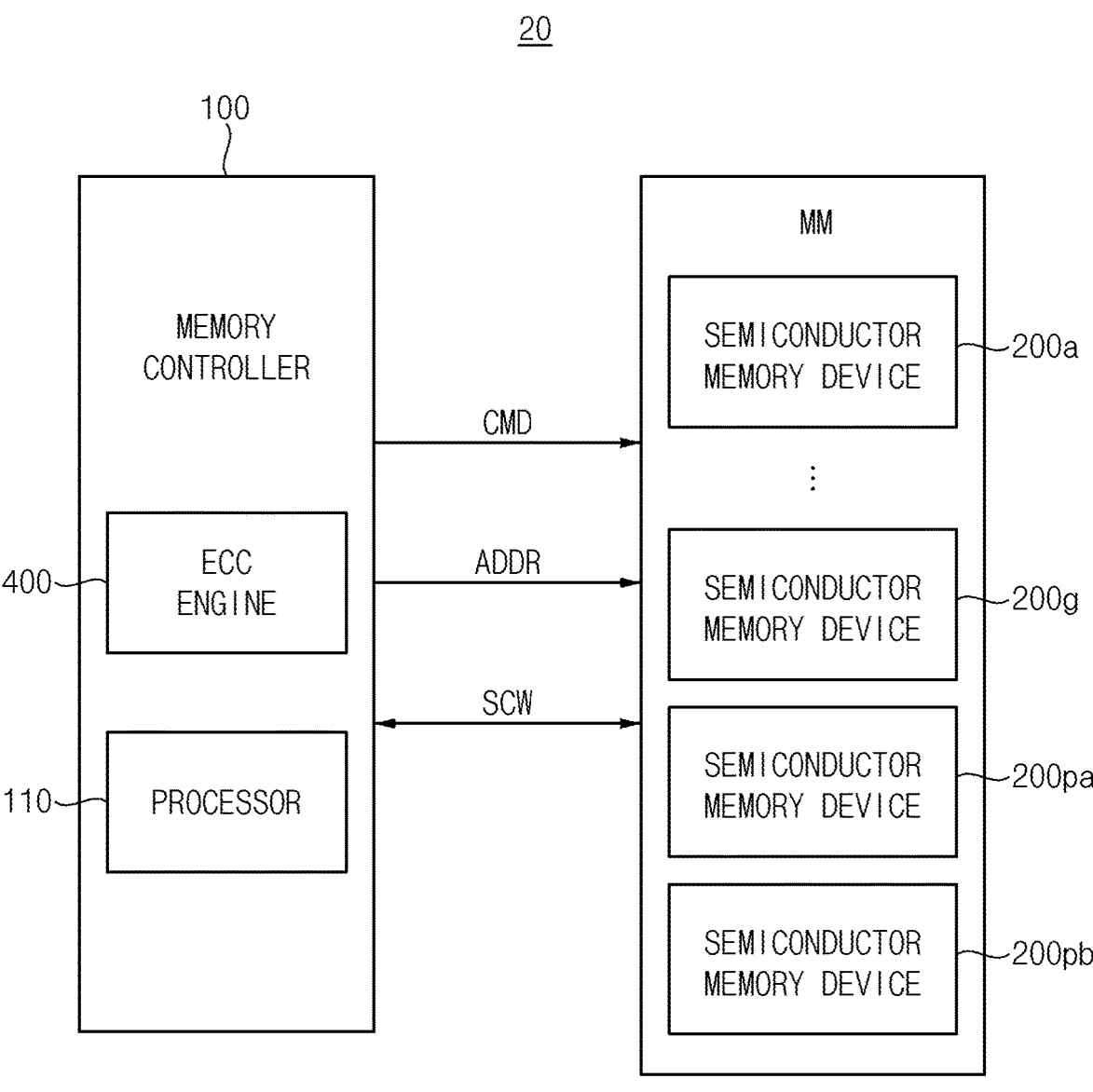
FIG. 1 is a block diagram illustrating a memory system, according to example embodiments.

Example embodiments of the present disclosure will be described more fully hereinafter with reference to the accompanying drawings. Like reference numerals may refer to like elements throughout the accompanying drawings. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a block diagram illustrating a memory system according to example embodiments.

Referring to FIG. 1, a memory system 20 may include a memory controller 100 and a memory module MM. The memory module MM may include a plurality of semiconductor memory devices $200a$~$200g$, $200pa$ and $200pb$. Here, g may be a natural number equal to or greater than two. Hereinafter, the plurality of semiconductor memory devices $200a$~$200g$, $200pa$ and $200pb$ may be referred to as a plurality of memory chips. The plurality of memory chips $200a$~$200g$, $200pa$ and $200pb$ may include a plurality of data chips $200a$~$200g$ and at least one parity chip $200pa$ and $200pb$. The at least one parity chip $200pa$ and $200pb$ may include a first parity chip $200pa$ and a second parity chip $200pb$.

The memory controller 100 may be configured to control an overall operation of the memory system 20. The memory controller 100 may control an overall data exchange between a host and the plurality of memory chips $200a$~$200g$, $200pa$ and $200pb$. For example, the memory controller 100 may write data in the plurality of memory chips $200a$~$200g$, $200pa$ and $200pb$ or read data from the plurality of memory chips $200a$~$200g$, $200pa$ and $200pb$ in response to a request from the host. In addition, the memory controller 30 may issue operation commands to the plurality of memory chips $200a$~$200g$, $200pa$ and $200pb$ for controlling the plurality of memory chips $200a$~$200g$, $200pa$ and $200pb$.

In example embodiments, each of the plurality of memory chips $200a$~$200g$, $200pa$ and $200pb$ includes volatile memory cells, such as a dynamic random access memory (DRAM).

In example embodiments, a number of the data chips $200a$~$200g$ may be 8. However, the number of the data chips $200a$~$200g$ is not limited thereto in accordance with different embodiments. In example embodiments, each of the data chips $200a$~$200g$ may be referred to as a data memory, and each of the parity chips $200pa$ and $200pb$ may be referred to as an error correction code (ECC) memory, or a redundant memory.

The memory controller 100 may be configured to transmit an address ADDR and a command CMD to the memory module MM and may be configured to exchange a codeword set SCW with the memory module MM. The codeword set (SCW) may incorporate error correction codes to detect errors that may occur in a message.

The memory controller 100 may include a processor 110 and an error correction code (ECC) engine 400.

The processor 110 may control overall operation of the memory controller 100 and may control the ECC engine 400. For example, in some embodiments, the ECC engine 400 may be embodied as computer readable program code stored in a computer readable medium. The computer readable program code may be executed by the processor 110. In other embodiments, the ECC engine 400 may include one or more processors for performing ECC encoding and/or decoding. These processors may operate under the supervision or control of the processor 110.

The ECC engine 400 may perform an ECC encoding on a user data set to generate a parity data set and may provide the memory module MM with the codeword set SCW including the user data set and the parity data set in a write operation of the memory system 20. The user data set may be stored in the data chips 200a~200g, a first portion of the parity data set may be stored in the first parity chip 200pa and a second portion of the parity data set may be stored in the second parity chip 200pb.

The ECC engine 400, in a read operation, may receive the codeword set SCW from the memory module MM and may correct Q symbols errors in the codeword set SCW. Here Q may a maximum natural number equal to or less than P, and P may a natural number equal to or greater than four. The ECC engine 400, in the read operation, may generate syndromes including first through P-th syndrome symbols based on the read codeword set SCW by using a parity check matrix and may perform a first ECC decoding to correct a single symbol error in the read codeword set SCW based on the first syndrome symbol and a selected syndrome symbol corresponding to one of the second through P-th syndrome symbols. For example, a syndrome may be generated by multiplying a received message by the transpose of the parity check matrix. The syndromes can be decoded by mapping syndromes to corresponding errors.

In addition, when the first ECC decoding fails, the ECC engine 400 may perform a second ECC decoding to correct multi symbol errors in the read codeword set SCW based on the first through P-th syndrome symbols. The ECC engine 400 may perform the second ECC decoding in parallel with the first ECC decoding or the ECC engine 400 may perform the first ECC decoding and the second ECC decoding sequentially.

Therefore, the ECC engine 400 may correct a single symbol error in the read codeword set SCW rapidly by using a portion of the first through P-th syndrome symbols and may reduce a ECC decoding latency.

Figure 2:
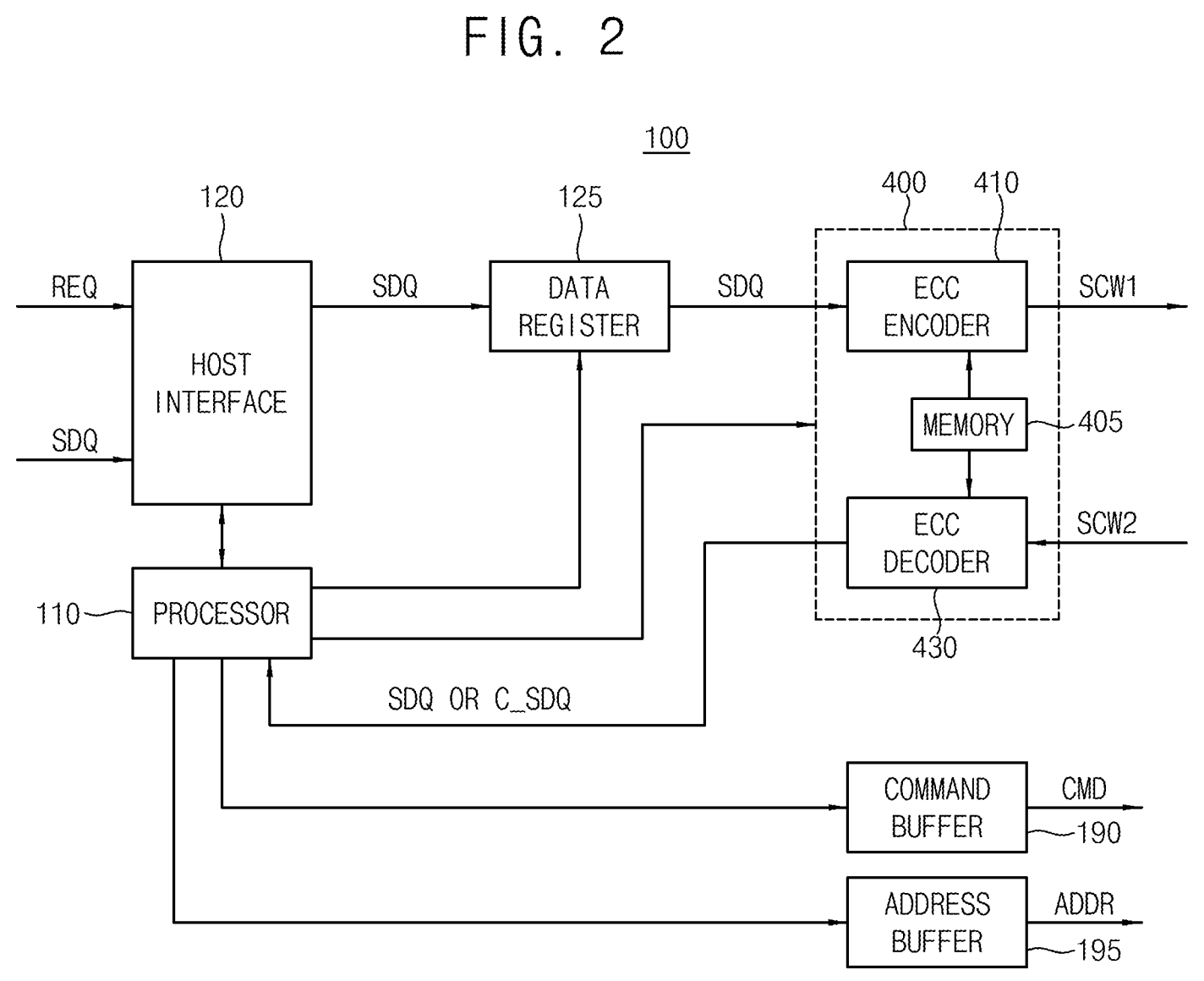

FIG. 2 is a block diagram illustrating an example of the memory controller in the memory system of FIG. 1 according to example embodiments.

Referring to FIG. 2, the memory controller 100 may include the processor 110, a host interface 120, a data register 125, the ECC engine 400, a command buffer 190 and an address buffer 195. The ECC engine 400 may include an ECC encoder 410, an ECC decoder 430 and a memory 405.

The host interface 120 may be configured to receive a request REQ and a user data set SDQ from the host, and may be configured to provide the user data set SDQ to the data register 125. The data register 125 may be configured to provide the user data set SDQ to the system ECC engine 130.

The ECC encoder 410 may be configured to perform an ECC encoding on the user data set SDQ using a parity generation matrix to generate a codeword set SCW1.

The ECC decoder 430 may correct Q symbol errors in a set SCW2 provided from the memory module MM. The ECC decoder 430 may be configured to generate a syndrome including first through P-th syndrome symbols based on the codeword set SCW2 by using a parity check matrix and may be configured to perform a first ECC decoding to correct a single symbol error in the codeword set SCW2 based on the first syndrome symbol and a selected syndrome symbol corresponding to one of the second through P-th syndrome symbols.

In addition, when the first ECC decoding fails, the ECC decoder 430 may be configured to perform a second ECC decoding to correct multi symbol errors in the codeword set SCW2 based on the first through P-th syndrome symbols. The ECC decoder 430 may be configured to perform the second ECC decoding in parallel with the first ECC decoding or the ECC decoder 430 may be configured to perform the first ECC decoding and the second ECC decoding sequentially.

The ECC decoder 430 may be configured to provide the processor 110 with one of the user data set SDQ and a corrected user data set C_SDQ by performing the first ECC decoding and by selectively performing the second ECC decoding.

The processor 110 may be configured to receive the user data set SDQ or the corrected user data set C_SDQ and may be configured to control the ECC engine 400, the command buffer 190 and the address buffer 195. The command buffer 190 may be configured to store the command CMD corresponding to the request REQ and may be configured to transmit the command CMD to the memory module MM under control of the processor 110. The address buffer 195 may be configured to store the address ADDR and may be configured to transmit the address ADDR to the memory module MM under control of the processor 110.

Figure 3:
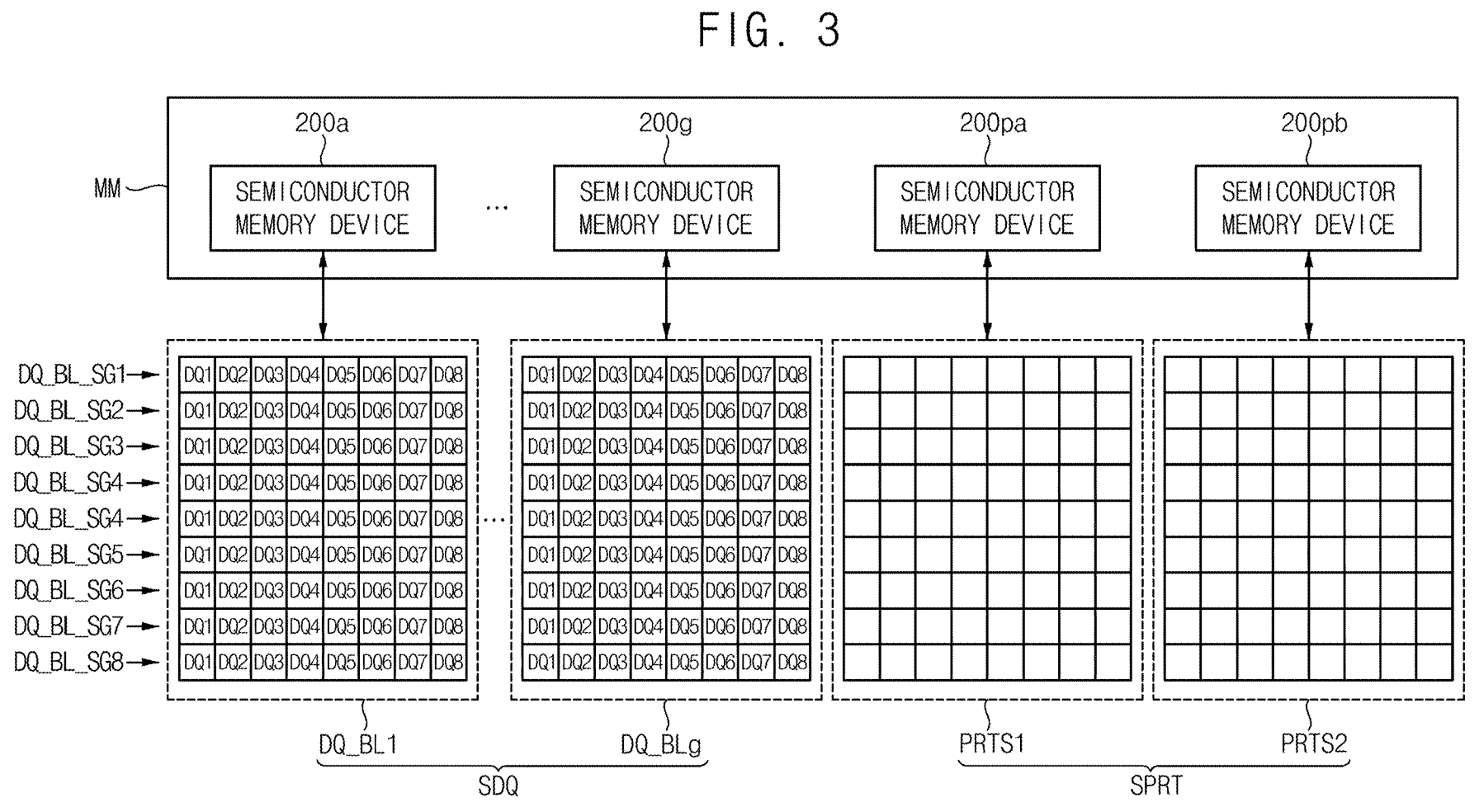

FIG. 3 illustrates data sets corresponding to a plurality of burst lengths in the memory system of FIG. 1, according to example embodiments.

Referring to FIG. 3, each of the data chips 200a~200g and the parity chips 200pa and 200pb may be configured to perform a burst operation. Herein, the burst operation refers to an operation of writing or reading a large amount of data by sequentially increasing or decreasing an initial address provided from the memory controller 100. A basic unit of the burst operation may be referred to a burst length BL.

Each of the data sets DQ_BL1~DQ_BLg corresponding to the plurality of burst lengths are input to/output from each of the data chips 200a~200g.

Each of the data sets DQ_BL1~DQ_BLg may include data segments DQ_BL_SG1~DQ_BL_SG8 corresponding to each burst length of the plurality of burst lengths. The data sets DQ_BL1~DQ_BL8 may correspond to the user data set SDQ. Each of the data segments DQ_BL_SG1~DQ_BL_SG8 may include data bits DQ1~DQ8.

The burst length is assumed to be 8 in FIG. 3 and it is assumed that the burst operation is performed once in accordance with example embodiments. While the burst operation is performed once in each of the data chips 200a~200g, a first parity data PRTS1 corresponding to the plurality of burst lengths are input to/output from the first parity chip 200*pa* and a second parity data PRTS2 corresponding to the plurality of burst lengths are input to/output from the second parity chip 200*pb*. The first parity data PRTS1 and the second parity data PRTS2 may constitute a parity data set SPRT.

Figure 4:
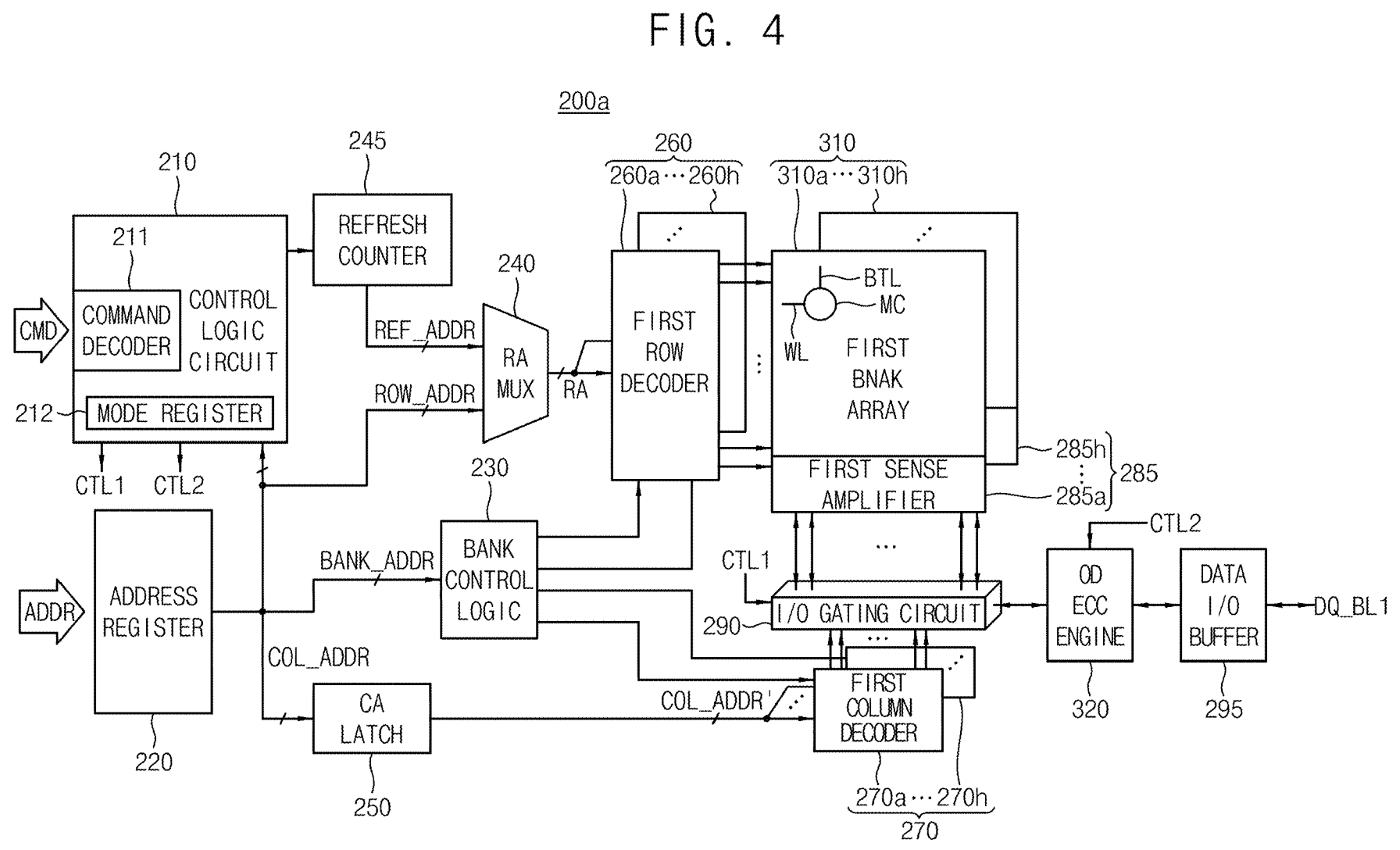

FIG. 4 is a block diagram illustrating one of the data chips in the memory module of FIG. 1 according to example embodiments.

In FIG. 4, it is assumed that each of the data chips 200*a*~200*g* in FIG. 1 uses a volatile memory device.

Referring to FIG. 4, the data chip 200*a* may include a control logic circuit 210, an address register 220, a bank control logic circuit 230, a row address multiplexer 240, a column address latch 250, a row decoder 260, a column decoder 270, a memory cell array 310, a sense amplifier unit 285, an input/output (I/O) gating circuit 290, an on-die ECC engine 320, a data input/output (I/O) buffer 295 and a refresh counter 245.

The memory cell array 310 may include first through eighth bank arrays 310*a*~310*h*.

The row decoder 260 may include first through eighth bank row decoders 260*a*~260*h* coupled to the first through eighth bank arrays 310*a*~310*h*, respectively, the column decoder 270 may include first through eighth bank column decoders 270*a*~270*h* coupled to the first through eighth bank arrays 310*a*~310*h*, respectively, and the sense amplifier unit 285 may include first through eighth bank sense amplifiers 285*a*~285*h* coupled to the first through eighth bank arrays 310*a*~310*h*, respectively.

The first through eighth bank arrays 310*a*~310*h*, the first through eighth bank row decoders 260*a*~260*h*, the first through eighth bank column decoders 270*a*~270*h*, and the first through eighth bank sense amplifiers 285*a*~285*h* may form first through eighth banks. Each of the first through eighth bank arrays 310*a*~310*h* may include a plurality of word-lines WL, a plurality of bit-lines BTL, and a plurality of memory cells MC formed at intersections of the word-lines WL and the bit-lines BTL.

Although the data chip 200*a* is illustrated in FIG. 4 as including eight banks, the data chip 200*a* may include any number of banks.

The address register 220 may be configured to receive the address ADDR including a bank address BANK_ADDR, a row address ROW_ADDR, and a column address COL_ADDR from the memory controller 100. The address register 220 may be configured to provide the received bank address BANK_ADDR to the bank control logic 230, may be configured to provide the received row address ROW_ADDR to the row address multiplexer 240, and may be configured to provide the received column address COL_ADDR to the column address latch 250.

The bank control logic 230 may be configured to generate bank control signals in response to the bank address BANK_ADDR. One of the first through eighth bank row decoders 260*a*~260*h* corresponding to the bank address BANK_ADDR may be activated in response to the bank control signals, and one of the first through eighth bank column decoders 270*a*~270*h* corresponding to the bank address BANK_ADDR may be activated in response to the bank control signals.

The row address multiplexer 240 may be configured to receive the row address ROW_ADDR from the address register 220, and may receive a refresh row address REF_ADDR from the refresh counter 245. The row address multiplexer 240 may be configured to selectively output the row address ROW_ADDR or the refresh row address REF_ADDR as a row address RA. The row address RA that is output from the row address multiplexer 240 may be applied to the first through eighth bank row decoders 260*a*~260*h*.

The activated one of the first through eighth bank row decoders 260*a*~260*h* may be configured to decode the row address RA that is output from the row address multiplexer 240, and may be configured to activate a word-line WL corresponding to the row address RA. For example, the activated bank row decoder may be configured to generate a word-line driving voltage and may be configured to apply the word-line driving voltage to the word-line WL corresponding to the row address RA.

The column address latch 250 may be configured to receive the column address COL_ADDR from the address register 220, and may be configured to temporarily store the received column address COL_ADDR. In example embodiments of the inventive concept, in a burst mode, the column address latch 250 may be configured to generate column addresses COL_ADDR' that increments from the received column address COL_ADDR. The column address latch 250 may be configured to apply the temporarily stored or generated column address COL_ADDR' to the first through eighth bank column decoders 270*a*~270*h*.

The activated one of the first through eighth bank column decoders 270*a*~270*h* may be configured to decode the column address COL_ADDR that is output from the column address latch 250, and may be configured to control the I/O gating circuit 290 to output data corresponding to the column address COL_ADDR.

The I/O gating circuit 290 may include circuitry for gating input/output data. The I/O gating circuit 290 may further include read data latches for storing data that is output from the first through eighth bank arrays 310*a*~310*h*, and write control devices for writing data to the first through eighth bank arrays 310*a*~310*h*.

A codeword read from one of the first through eighth bank arrays 310*a*~310*h* may be sensed by a sense amplifier coupled to the one bank array from which the data is to be read, and may be stored in the read data latches.

The codeword stored in the read data latches may be provided to the on-die ECC engine 320. The on-die ECC engine 320 may be configured to generate a data set by performing an ECC decoding on the code word and may be configured to provide the data set to the data I/O buffer 295. The data I/O buffer 295 may be configured to provide the data set DQ_BL1 to the memory controller 100. Data set DQ_BL1 to be written in one of the first through eighth bank arrays 310~380 may be provided to the data I/O buffer 295 from the memory controller 100. The data I/O buffer 295 may be configured to provide the data set to the on-die ECC engine 320. The on-die ECC engine 320 may be configured to generate parity bits based on the data set and may be configured to provide the I/O gating circuit 290 with a codeword including the data set and the parity bits. The I/O gating circuit 290 may be configured to store the codeword in a sub-page of one bank array.

The on-die ECC engine 320, in a write operation, may be configured to generate the parity bits by performing an ECC encoding on the data set DQ_BL1 from the data I/O buffer 295 and may be configured to store a codeword including the data set DQ_BL1 and the parity bits in a target page of the memory cell array 310.

In example embodiments, the on-die ECC engine 320 may be configured to correct an error bit in the data set by unit of symbol in similar fashion as the ECC engine 400 in the memory controller 100. The on-die ECC engine 320 may be configured to generate a syndrome including a plurality of syndrome bits or symbols based on a parity check matrix, and perform a first ECC decoding to correct a single symbol error in a codeword including the data set DQ_BL based on at least two syndrome bits or symbols from among the plurality of syndrome bits.

When the first ECC decoding fails, the on-die ECC engine 320 may be configured to perform a second ECC decoding to correct multi symbol errors in the codeword including the data set DQ_BL based on all of the syndrome bits or symbols.

The on-die ECC engine 320 may be configured to perform the second ECC decoding in parallel with the first ECC decoding. The on-die ECC engine 320 may be further configured to perform the first ECC decoding and the second ECC decoding sequentially.

In example embodiments, the on-die ECC engine 320 may not be included in the data chip 200a.

The control logic circuit 210 may be configured to control operations of the data chip 200a. For example, the control logic circuit 210 may be configured to generate control signals for the data chip 200a to perform the write operation or the read operation. The control logic circuit 210 may include a command decoder 211 that is configured to decode the command CMD received from the memory controller 100 and a mode register 212 that is configured to set an operation mode of the data chip 200a.

For example, the command decoder 211 may be configured to generate the control signals corresponding to the command CMD by decoding a write enable signal, a row address strobe signal, a column address strobe signal, a chip select signal, etc.

The control logic circuit 210 may be configured to generate a first control signal CTL1 to control the I/O gating circuit 290 and a second control signal CTL2 to control the on-die ECC engine 320 by decoding the command CMD.

Each of the parity chips 200pa and 200pb in FIG. 1 may have substantially the same configuration as the data chip 200a. Each of the parity chips 200pa and 200pb may input/output a corresponding parity data item.

Figure 5:
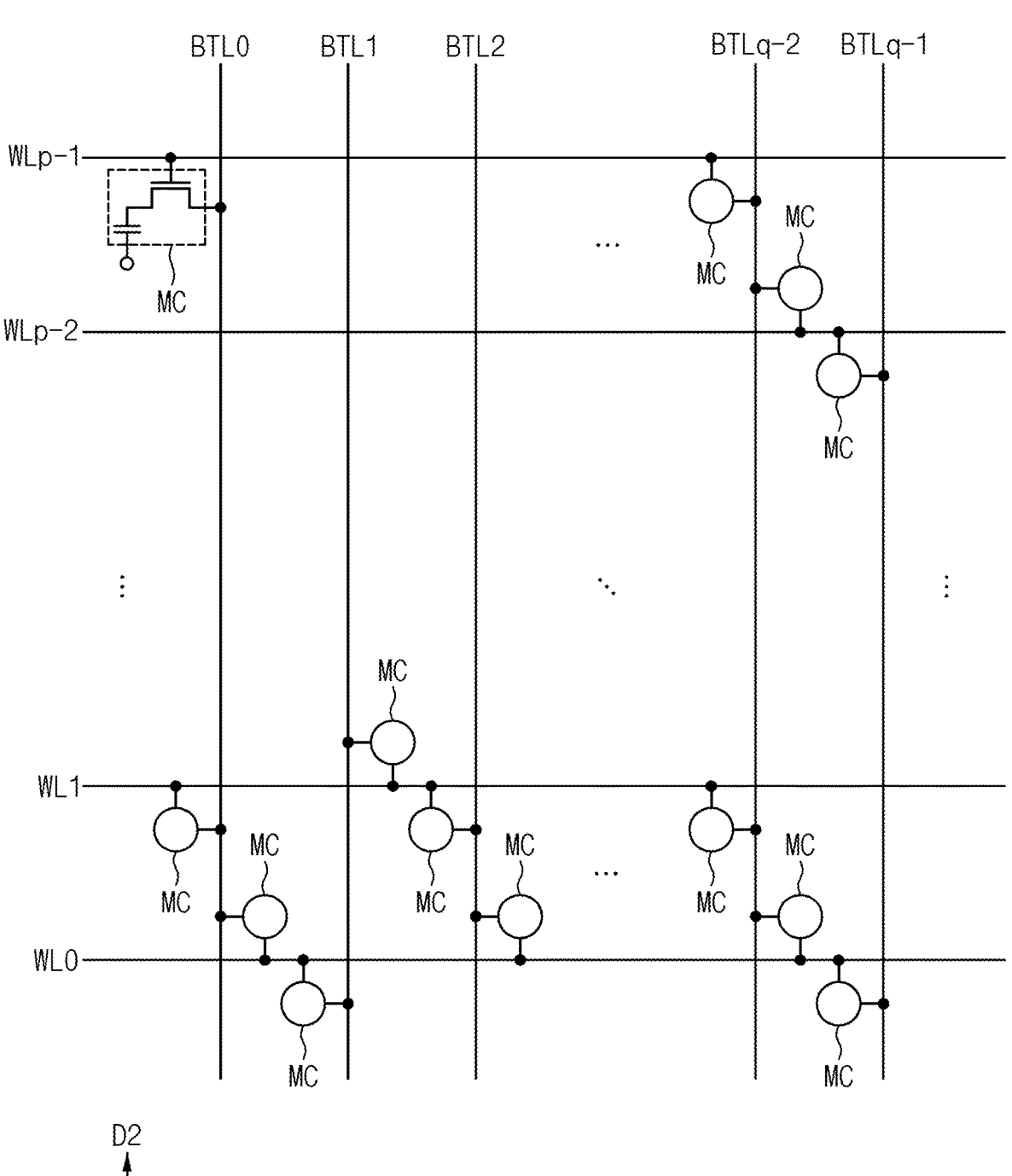
FIG. 5 illustrates an example of the first bank array in the data chip of FIG. 4 according to example embodiments.

FIG. 5 illustrates an example of the first bank array in the data chip of FIG. 4 according to example embodiments.

Referring to FIG. 5, the first bank array 310a may include a plurality of word-lines WL0~WLp-1 (where p is an even number equal to or greater than two), a plurality of bit-lines BTL0~BTLq-1 (where q is an even number equal to or greater than two), and a plurality of memory cells MCs disposed at intersections between the word-lines WL0~WLp-1 and the bit-lines BTL0~BTLq-1.

The word-lines WL0~WLp-1 may extend in a first direction D1 and the q bit-lines BTL0~BTLq-1 may extend in a second direction D2.

Each of the memory cells MCs includes an access (cell) transistor coupled to one of the word-lines WL0~WLp-1 and one of the bit-lines BTL0~BTLq-1 and a storage (cell) capacitor coupled to the cell transistor. That is, each of the memory cells MCs has a DRAM cell structure.

In addition, the memory cells MCs may have a different arrangement depending on whether the memory cells MCs are coupled to an even word-line (for example, WL0) or an odd word-line (for example, WL1). That is, a bit-line coupled to adjacent memory cells may be different depending on whether a word-line selected by an access address is an even word-line or an odd word-line.

Figure 6:
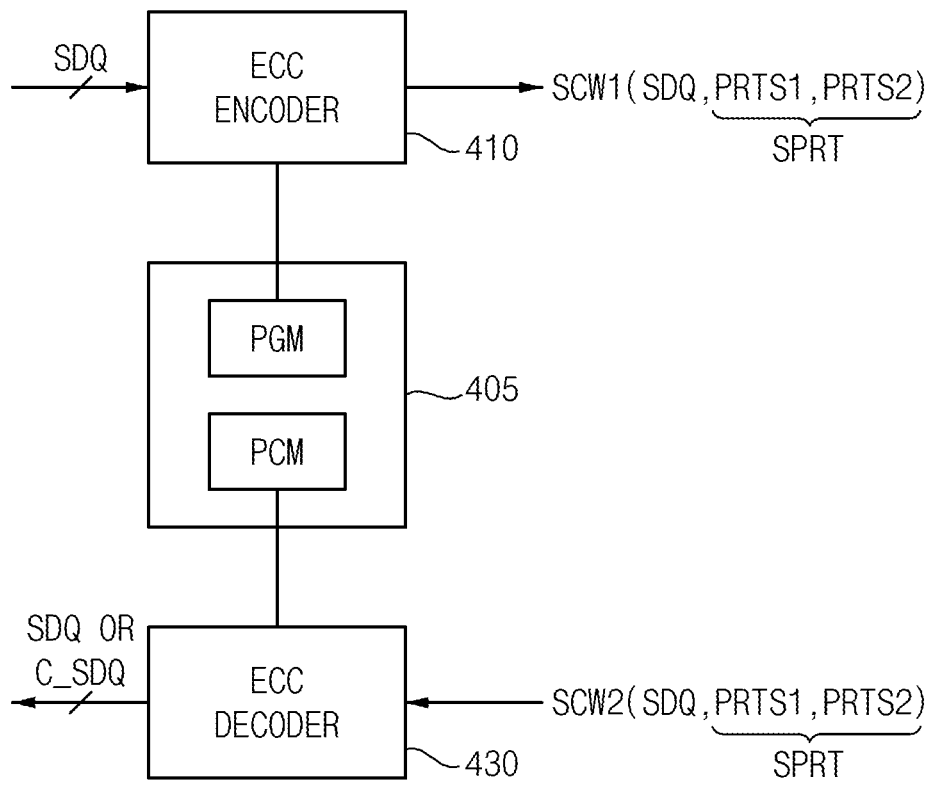
FIG. 6 is a block diagram illustrating an example of the system ECC engine in FIG. 2 according to example embodiments.

FIG. 6 is a block diagram illustrating an example of the ECC engine in FIG. 2 according to example embodiments.

Referring to FIG. 6, the ECC engine 400 may include an ECC encoder 410, an ECC decoder 430 and a memory 405. The memory 405 may be referred to as an ECC memory.

The memory 405 may be connected to the ECC encoder 410 and the ECC decoder 430 and may be configured to store a parity generation matrix PGM and a parity check matrix PCM.

The ECC encoder 140 may be configured to perform an ECC encoding on the user data set SDQ by using the parity generation matrix PCM to generate a parity data set SPRT including the first parity data PRTS1 and the second parity data PRTS2 and may output the codeword set SCW1 including the user data set SDQ and the parity data set SPRT.

The ECC decoder 430 may be configured to generate a syndrome including the first through P-th syndrome symbols based on the codeword set SCW2 including the user data set SDQ and the parity data set SPRT by using the parity check matrix PCM, and may be configured to perform a first ECC decoding to correct a single symbol error in the codeword set SCW2 based on the first syndrome symbol and a selected syndrome symbol corresponding to one of the second through P-th syndrome symbols. When the first ECC decoding fails, the ECC decoder 430 may be configured to perform a second ECC decoding to correct multi symbol errors in the codeword set SCW2 based on all of the first through P-th syndrome symbols to output the corrected user data set C_SDQ. When the ECC decoder 430 cannot correct the multi symbol errors, the ECC decoder 430 may be configured to output the user data set SDQ.

Figure 7:
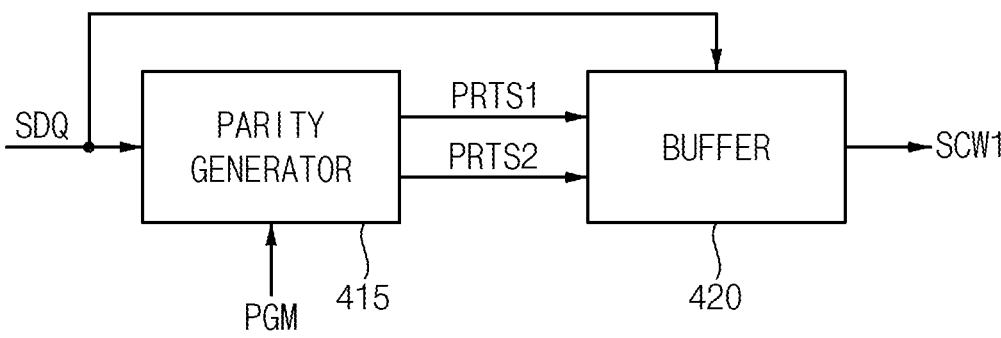
FIG. 7 illustrates an example of the ECC encoder in the ECC engine of FIG. 6 according to example embodiments.

FIG. 7 illustrates an example of the ECC encoder in the ECC engine of FIG. 6 according to example embodiments.

Referring to FIG. 7, the ECC encoder 410 may include a parity generator 415 and a buffer 420.

The parity generator 415 may be configured to perform an ECC encoding on the user data set SDQ by using the parity generation matrix PCM to generate the first parity data PRTS1 and the second parity data PRTS2 and may be configured to provide the first parity data PRTS1 and the second parity data PRTS2 to the buffer 420.

The buffer 420 may be configured to temporarily store the user data set SDQ, the first parity data PRTS1 and the second parity data PRTS2 and may provide the memory module MM with the first codeword set SCW1 including the user data set SDQ, the first parity data PRTS1 and the second parity data PRTS2.

FIG. 8 illustrates a transposition matrix of the parity check matrix stored in the memory in the ECC engine of FIG. 6 according to some embodiments.

Although FIG. 8 illustrates an example of the parity check matrix PCM, the parity generation matrix PGM may have a similar configuration with the parity check matrix PCM.

Referring to FIG. 8, the parity check matrix PCM may be generated based on a Reed-Solomon code and may be used for generating the syndrome including a plurality of syndrome symbols.

A transposition matrix $PCM^T$ of the parity check matrix PCM may include a plurality of alpha matrixes $\alpha^0$, $\alpha^1, \alpha^2, \ldots, \alpha^N, \alpha^2, \alpha^4, \ldots, \alpha^{2N}, \alpha^3, \alpha^6, \ldots, \alpha^{3N}, \ldots, \alpha^{P-1}, \alpha^{2(P-1)}, \ldots, \alpha^{N(P-1)}$ corresponding to read symbols read from the plurality of data chips 200a~200g and the at least one parity chip 200pa and 200pb. Here N may correspond to a number of the read symbols read from the plurality of data chips 200a~200g and the at least one parity chip 200pa and 200pb and P may indicates a number of parity symbols in the read symbols.

The alpha matrix $\alpha^0$ may indicate an identity matrix and the a matrix may be obtained by using an m-order primitive polynomial. The alpha matrix $\alpha^2$ may be obtained by involution of $\alpha$. Elements of the a matrixes may belong to Galois field. Here, m may represent a number of bits in one symbol.

A maximum code length (unit: symbol) in the Reed-Solomon code defined by a Galois field of $(2^m)$ may correspond to $2^m-1$ (=K+P, K is a number of data symbols and P is a number of parity symbols) and error correction capability of the Reed-Solomon code may be a maximum natural number equal to or less than P/2.

FIG. 9 illustrates a syndrome that the ECC decoder generates in the ECC engine of FIG. 6 according to some embodiments.

Referring to FIG. 9, when a vector representation of the codeword set SCW1 stored in the memory module MM corresponds to CV, equation 1 is deduced.

$$CV = WDV \times G, \qquad \text{[equation 1]}$$

where WDV is a vector representation of the user data set SDQ and G is a vector representation of the parity generation matrix PGM.

When a vector representation of the codeword set SCW2 read from the memory module MM corresponds to R, R may include errors and R may be represented by equation 2.

$$R = WDV \times G + E, \qquad \text{[equation 2]}$$

where E corresponds to a vector representation of the errors.

The ECC decoder 430 may be configured to perform calculation on the read codeword set SCW2 with the parity check matrix PCM. When a vector representation of the parity check matrix PCM corresponds to H, a result of the calculation corresponds to equation 3.

$$H^T \times R = H^T \times WDV \times G + H^T \times E \qquad \text{[equation 3]}$$

The parity generation matrix G and the parity check matrix H are set for satisfying equation 4.

$$G \times H^T = 0 \qquad \text{[equation 4]}$$

Therefore, equation 5 is deduced.

$$H^T \times R = H^T \times E$$

A result of equation 5 may correspond to a vector representation S of the syndrome. The vector representation S of the syndrome may be obtained by multiplying the transposition matrix $PCM^T$ of the parity check matrix PCM and the vector representation of the errors.

The vector representation S of the syndrome may include first through P-th syndrome symbols $S_0, S_1, S_2, S_3, \ldots, S_{P-1}$. That is, the first through P-th syndrome symbols $S_0, S_1, S_2, S_3, \ldots, S_{P-1}$ may indicate symbols including an error.

FIG. 10 illustrates a vector representation of the read codeword set in FIG. 9 according to example embodiments.

Referring to FIG. 10, a vector representation R of the read codeword set SCW2 may include first through N-th read symbols $r_0, r_1, r_2, r_3, \ldots, r_{N-1}$.

FIG. 11 illustrates an example that one of the plurality of read symbols is corrected in FIG. 10.

Referring to FIG. 11, a read symbol ri corresponding to a target symbol from among the first through N-th read symbols $r_0, r_1, r_2, r_3, \ldots, r_{N-1}$ is corrected and thus a vector representation R' of a read codeword set including a corrected target symbol $ri^C$ is generated.

FIG. 12 illustrates an example that the ECC decoder generates a check syndrome using the corrected target symbol according to example embodiments.

Referring to FIG. 12, the ECC decoder 430 may be configured to generate a check syndrome having a vector representation S' by performing matrix-multiplication operation on the transposition matrix $PCM^T$ of the parity check matrix PCM and the vector representation R' of the read codeword set including a corrected target symbol $ri^C$. The vector representation S' of the check syndrome may include first through P-th check syndrome symbols $S_0', S_1', S_2', S_3', \ldots, S_{P-1}'$. When all values of the first through P-th check syndrome symbols $S_0', S_1', S_2', S_3', \ldots, S_{P-1}'$ are zero, the ECC decoder 430 may determine that the single symbol error is corrected.

Figure 13:
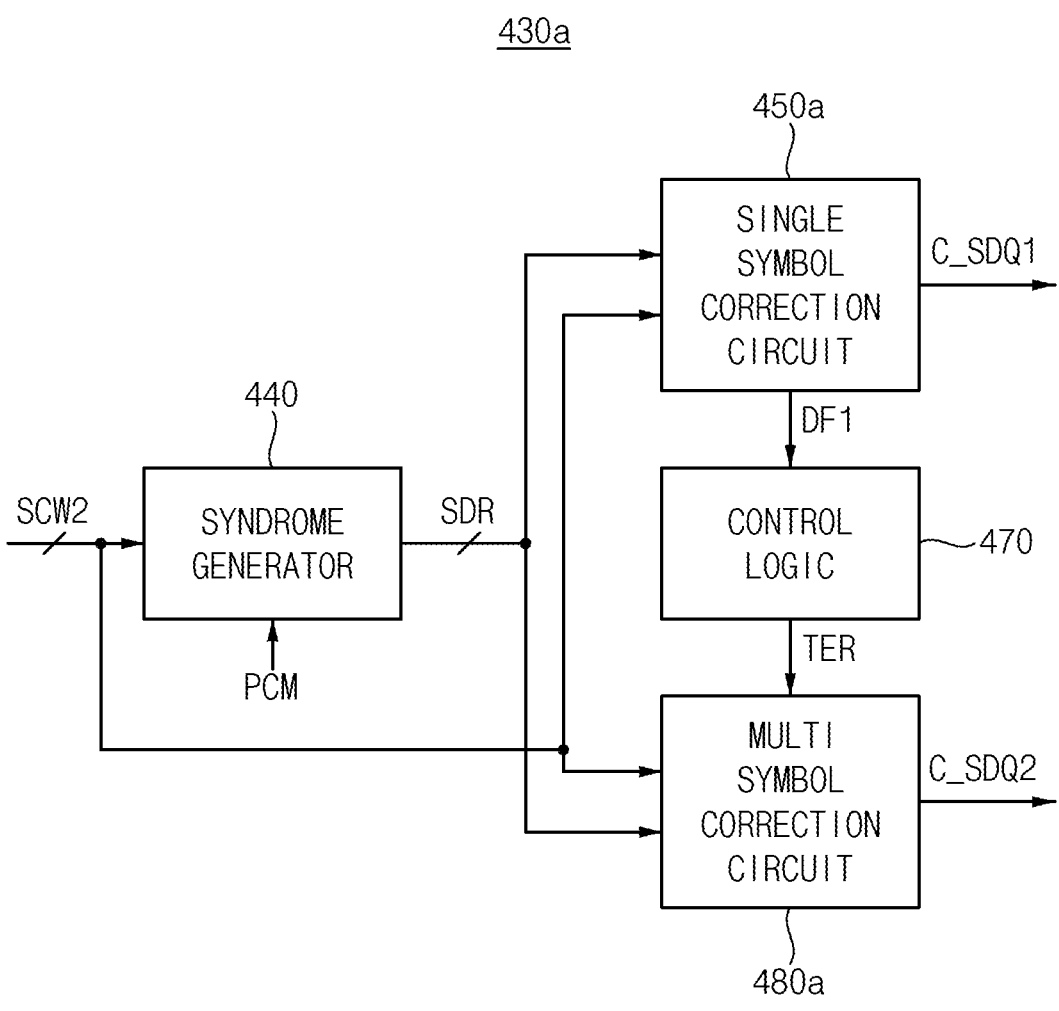
FIG. 13 is a block diagram illustrating an example of the ECC decoder in the ECC engine of FIG. 6 according to example embodiments.

FIG. 13 is a block diagram illustrating an example of the ECC decoder in the ECC engine of FIG. 6 according to example embodiments.

Referring to FIG. 13, an ECC decoder 430a may include a syndrome generator 440, a single symbol correction circuit 450a, a control logic 470 and a multi symbol correction circuit 480a.

The syndrome generator 440 may be configured to generate a syndrome SDR by performing a matrix-multiplication operation on the read codeword set SCW2 and the parity check matrix PCM (or, the transposition matrix $PCM^T$ of the parity check matrix PCM as mentioned with reference to FIG. 9) and may provide the syndrome SDR to the single symbol correction circuit 450a and the multi symbol correction circuit 480a.

That is, the syndrome generator 440 may generate a syndrome SDR including the first through P-th syndrome symbols $S_0, S_1, S_2, S_3, \ldots, S_{P-1}$ by performing a matrix-multiplication operation on the transposition matrix $PCM^T$ of the parity check matrix PCM and the vector representation R of the read codeword set SCW2 as illustrated in FIG. 9 and may provide the syndrome SDR to the single symbol correction circuit 450a and the multi symbol correction circuit 480a.

The single symbol correction circuit 450a may be configured to receive the syndrome SDR and the read codeword set SCW2, may be configured to perform a first ECC decoding to correct a single symbol error in the read codeword set SCW2 by using (i.e., based on) a portion of the first through P-th syndrome symbols $S_0, S_1, S_2, S_3, \ldots, S_{P-1}$ to output a corrected user data set C_SDQ1 and may be configured to provide the control logic 470 with a decoding flag DF1 indicating whether the first ECC decoding is successful.

The multi symbol correction circuit 480a may be configured to receive the syndrome SDR and the read codeword set SCW2, and may be configured to perform a second ECC decoding to correct multi symbol errors in the read codeword set SCW2 by using (i.e., based on) all of the first through P-th syndrome symbols $S_0, S_1, S_2, S_3, \ldots, S_{P-1}$ to output a corrected user data set C_SDQ2.

The single symbol correction circuit 450a and multi symbol correction circuit 480a may be configured to operate in parallel. The first ECC decoding by the single symbol correction circuit 450a may be performed in parallel with the second ECC decoding by the multi symbol correction circuit 480a.

The control logic 470 may be configured to selectively terminate an operation of the multi symbol correction circuit 480a based on the decoding flag DF1. The control logic 470 may be configured to terminate the second ECC decoding performed by the multi symbol correction circuit 480a by providing a termination signal TER to the multi symbol correction circuit 480a in response to the decoding flag DF1 indicating that the first ECC decoding is successful.

Therefore, when the single symbol error exists in the read codeword set SCW2 and the single symbol correction circuit 450a corrects the single symbol error, the second ECC decoding by the multi symbol correction circuit 480a may be terminated, and thus the ECC decoder 430a may reduce decoding latency corresponding to a time interval required for correcting symbol error.

FIG. 14 is a block diagram illustrating an example of the single symbol correction circuit in the ECC decoder of FIG. 13 according to example embodiments.

Referring to FIG. 14, a single symbol correction circuit 450aa may include an error magnitude and symbol position estimator 451, a single symbol error corrector 453 and an error correction checker 455.

The error magnitude and symbol position estimator 451 may be configured to receive the read codeword set SCW2, may be configured to estimate an error magnitude and a position of a target symbol in which an error exists based on the first syndrome symbol $S_0$ and a selected syndrome symbol $S_1$ (i.e., the second syndrome symbol) corresponding to one of the second through P-th syndrome symbols $S_1, S_2, S_3, \ldots, S_{P-1}$ and may provide an estimated target symbol ri to the single symbol error corrector 455.

The error magnitude and symbol position estimator 451 may estimate the first syndrome symbol $S_0$ as the error magnitude. The error magnitude and symbol position estimator 451 may estimate position information i of a target matrix element corresponding to a ratio of the selected syndrome symbol $S_1$ to the first syndrome symbol $S_0$ in a selected row $\alpha^1, \alpha^2, \ldots, \alpha^N$ corresponding to the selected syndrome symbol $S_1$ as the position of the target symbol when the target matrix element $\alpha^1$ exists in the selected row $\alpha^1, \alpha^2, \ldots, \alpha^N$ from among a plurality of rows in the transposition matrix $PCM^T$ in FIG. 9.

The error magnitude and symbol position estimator 451 may be configured to provide the control logic 470 with a decoding flag DF11 indicating that the first ECC decoding fails (i.e., not successful) when the target matrix element $\alpha^i$ corresponding to a ratio of the selected syndrome symbol $S_1$ to the first syndrome symbol $S_0$ does not exist in the selected row $\alpha^1, \alpha^2, \ldots, \alpha^N$.

The single symbol error corrector 453 may be configured to correct an error of the estimated target symbol ri based on the first syndrome symbol $S_0$ and may provide a corrected target symbol ri$^C$ to the error correction checker 455. The single symbol error corrector 453 may be configured to generate the corrected target symbol ri$^C$ by adding the first syndrome symbol $S_0$ to the estimated target symbol ri.

The error correction checker 455 may be configured to receive the read codeword set SCW2, may be configured to replace the estimated target symbol ri with the corrected target symbol ri$^C$, may be configured to perform a matrix-multiplication operation on the transposition matrix $PCM^T$ and a codeword set including the corrected target symbol ri$^C$ to generate the check syndrome S' of FIG. 12 and may be configured to check whether the single symbol error is corrected based on whether all values of the first through P-th check syndrome symbols $S_0', S_1', S_2', S_3', \ldots, S_{P-1}'$ of the check syndrome S' is zero.

When all values of the first through P-th check syndrome symbols $S_0', S_1', S_2', S_3', \ldots, S_{P-1}'$ are zero, which indicates additional symbol error does not exist in the read codeword set SCW2 except the corrected single symbol error, the error correction checker 455 may be configured to provide the control logic 470 with a decoding flag DF2 indicating that the first ECC decoding is successful.

When at least one of values of the first through P-th check syndrome symbols $S_0', S_1', S_2', S_3', \ldots, S_{P-1}'$ is non-zero, which indicates additional symbol error exists in the read codeword set SCW2 except the corrected single symbol error, the error correction checker 455 may be configured to provide the control logic 470 with the decoding flag DF2 indicating that the first ECC decoding fails.

In FIG. 14, embodiments are described in which the second syndrome symbol $S_1$ is used as the selected syndrome symbol. When the third syndrome symbol $S_2$ is used as the selected syndrome symbol, the error magnitude and symbol position estimator 451 may estimate position information i of a target matrix element as the position of the target symbol when the target matrix element $\alpha^i$ corresponding to a ratio of the selected syndrome symbol $S_2$ to the first syndrome symbol $S_0$ exists in a selected row $\alpha^2, \alpha^4, \ldots, \alpha^{2N}$ corresponding to the selected syndrome symbol $S_2$ from among the plurality of rows in the transposition matrix $PCM^T$ in FIG. 9.

That is, the error magnitude and symbol position estimator 451 may be configured to use one of the second through P-th syndrome symbols $S_1, S_2, S_3, \ldots, S_{P-1}$ as the selected syndrome symbol and may be configured to estimate position information i of a target matrix element as the position of the target symbol when the target matrix element $\alpha^i$ corresponding to a ratio of the selected syndrome symbol to the first syndrome symbol $S_0$ exists in a selected row corresponding to the selected syndrome symbol from among the plurality of rows in the transposition matrix $PCM^T$ in FIG. 9.

Figure 15:
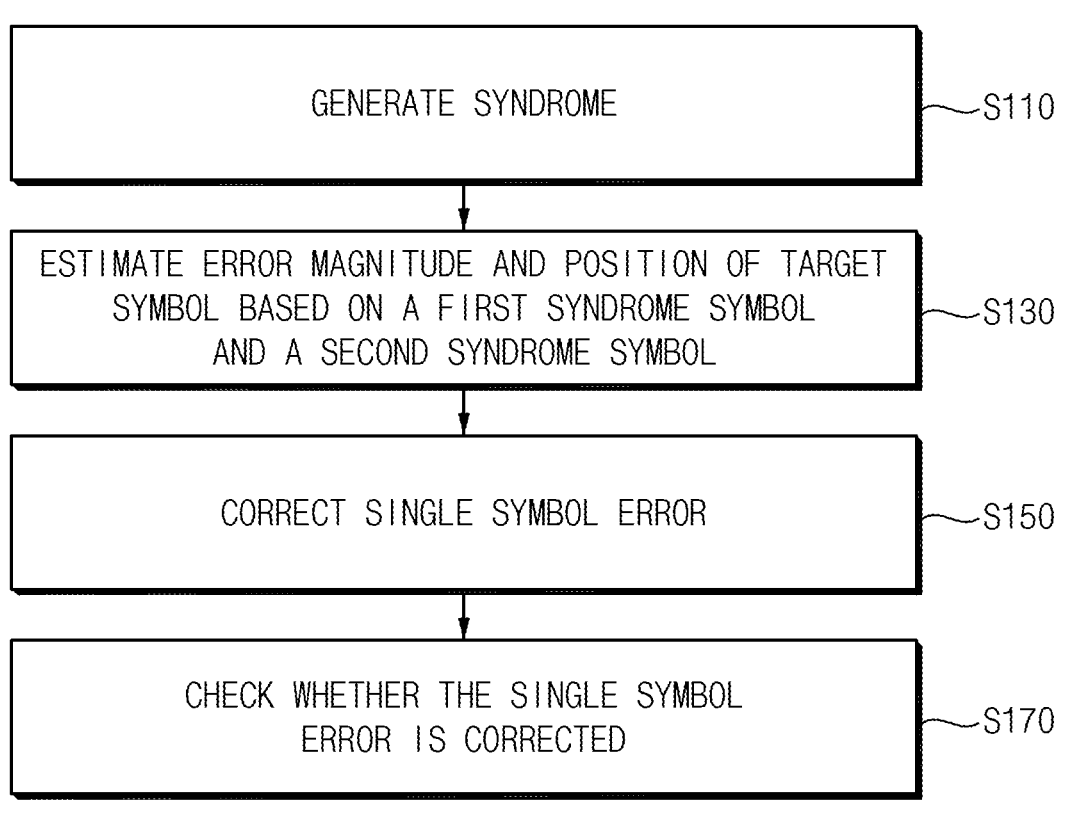
FIG. 15 illustrates an example operation of the single symbol correction circuit of FIG. 14 according to example embodiments.

FIG. 15 illustrates an example operation of the single symbol correction circuit of FIG. 14 according to example embodiments.

In FIG. 15, operation of the syndrome generator 440 in FIG. 13 is also illustrated for convenience of description.

Referring to FIGS. 13 through 15, the syndrome generator 440 may generate the syndrome SDR including the first through P-th syndrome symbols $S_0, S_1, S_2, S_3, \ldots, S_{P-1}$ by performing a matrix-multiplication operation on the transposition matrix $PCM^T$ of the parity check matrix PCM and the vector representation R of the read codeword set SCW2 as illustrated in FIG. 9 (operation S110).

The single symbol correction circuit 450aa may estimate the error magnitude and the position of a target symbol in which an error exists based on the first syndrome symbol $S_0$ and the selected syndrome symbol $S_1$ (i.e., the second syndrome symbol) corresponding to one of the second through P-th syndrome symbols $S_1, S_2, S_3, \ldots, S_{P-1}$ (operation S130).

The single symbol correction circuit 450aa may correct an error of the (estimated) target symbol ri based on the first syndrome symbol $S_0$ (operation S150).

The single symbol correction circuit 450aa may perform a matrix-multiplication operation on the transposition matrix $PCM^T$ and a codeword set including the corrected target symbol $ri^C$ to generate the check syndrome S' of FIG. 12 and may be configured to verify or check whether the single symbol error is corrected based on whether all values of the first through P-th check syndrome symbols $S_0'$, $S_1'$, $S_2'$, $S_3'$, . . . , $S_{P-1}'$ of the check syndrome S' is zero (operation S170).

Figure 16:
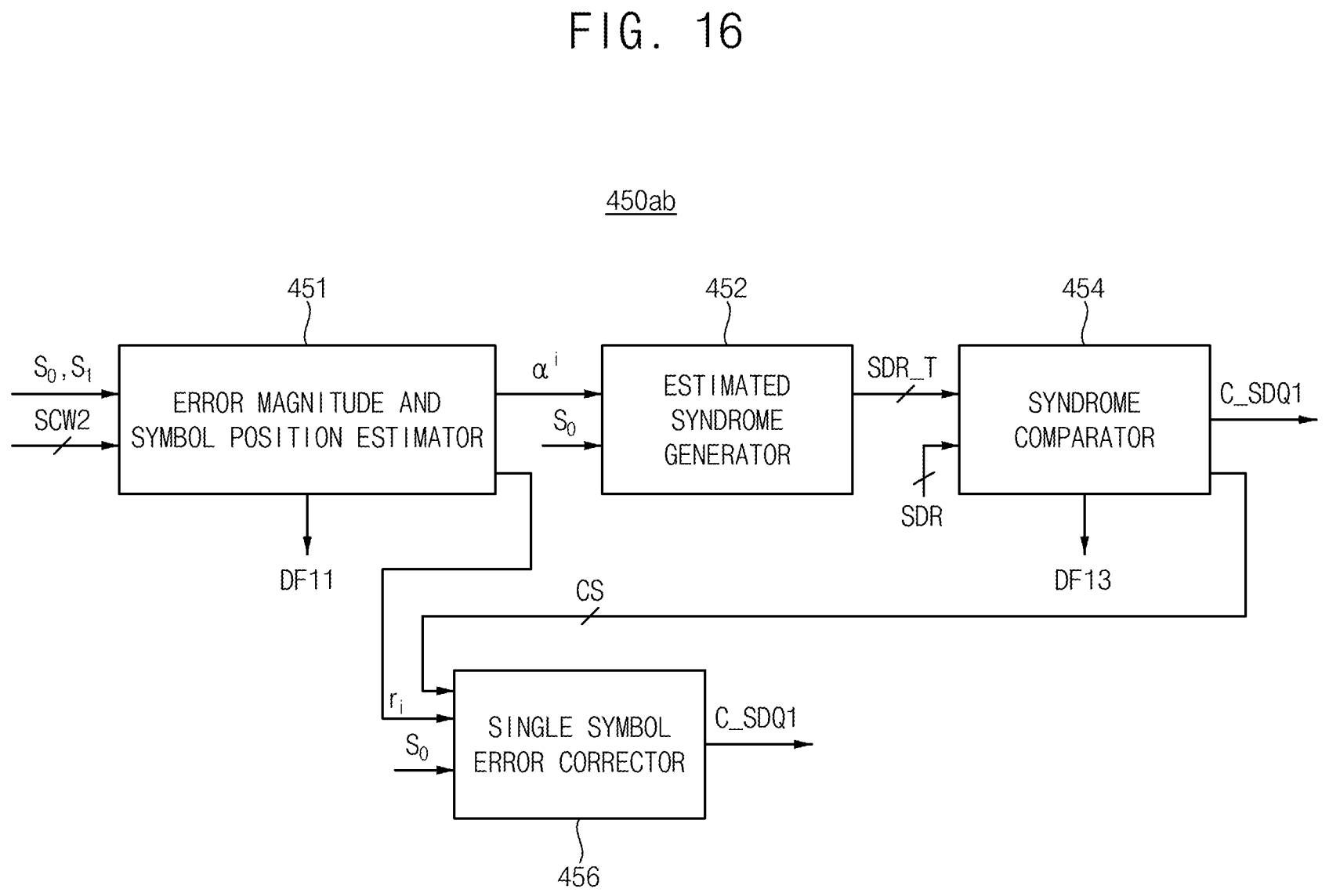

FIG. 16 is a block diagram illustrating an example of the single symbol correction circuit in the ECC decoder of FIG. 13 according to example embodiments.

Referring to FIG. 16, a single symbol correction circuit 450ab may include an error magnitude and symbol position estimator 451, an estimated syndrome generator 452, a syndrome comparator 454 and an error correction checker 456.

The error magnitude and symbol position estimator 451 may be configured to receive the read codeword set SCW2, may be configured to estimate an error magnitude and a position of a target symbol in which an error exists based on the first syndrome symbol $S_0$ and a selected syndrome symbol $S_1$ (i.e., the second syndrome symbol) corresponding to one of the second through P-th syndrome symbols $S_1$, $S_2$, $S_3$, . . . , $S_{P-1}$ and may be configured to provide an estimated target symbol ri to the single symbol error corrector 456.

The error magnitude and symbol position estimator 451 may be configured to estimate the first syndrome symbol $S_0$ as the error magnitude. The error magnitude and symbol position estimator 451 may be configured to estimate position information i of a target matrix element corresponding to a ratio of the selected syndrome symbol $S_1$ to the first syndrome symbol $S_0$ in the selected row $\alpha^1$, $\alpha^2$, . . . , $\alpha^N$ corresponding to the selected syndrome symbol $S_1$ as the position of the target symbol when the target matrix element $\alpha^1$ exists in the selected row $\alpha^1$, $\alpha^2$, . . . , $\alpha^N$ from among a plurality of rows in the transposition matrix $PCM^T$ in FIG. 9 and may be configured to provide the target matrix element $\alpha^i$ to the estimated syndrome generator 452.

The error magnitude and symbol position estimator 451 may be configured to provide the control logic 470 with a decoding flag DF 11 indicating that the first ECC decoding fails (i.e., not successful) when the target matrix element $\alpha^i$ corresponding to a ratio of the selected syndrome symbol $S_1$ to the first syndrome symbol $S_0$ does not exist in the selected row $\alpha^1$, $\alpha^2$, . . . , $\alpha^N$.

The estimated syndrome generator 452 may be configured to generate an estimated syndrome SDR_T based on based on the target matrix element $\alpha^1$ and the first syndrome symbol $S_0$ and may be configured to provide the estimated syndrome SDR_T to the syndrome comparator 454. That is, the estimated syndrome generator 452 may be configured to generate the estimated syndrome SDR_T by performing an operation based on the target matrix element $\alpha^i$ and the first syndrome symbol $S_0$.

The estimated syndrome generator 452 may generate the estimated syndrome SDR_T by following equation 6.

$$T_k = S_0 \times (\alpha^i)^k, \ k = 1, \ldots, P-1 \qquad \text{[equation 6]}$$

where $T_k$ denotes a vector representation of the estimated syndrome SDR_T.

Therefore, the estimated syndrome SDR_T may include second through P-th estimated syndrome symbols.

The syndrome comparator 454 may be configured to generate a comparison signal CS by comparing the second through P-th syndrome symbols of the syndrome SDR with the second through P-th estimated syndrome symbols of the estimated syndrome SDR_T, respectively, and may provide the comparison signal CS to the single symbol error corrector 456.

The syndrome comparator 454 may be configured to determine that the first decoding fails in response to at least one pair of the second through P-th syndrome symbols and the second through P-th estimated syndrome symbols, respectively, not matching each other and may provide the control logic 470 with a decoding flag DF13 indicating the first ECC decoding fails.

The syndrome comparator 454 may be configured to determine that the first decoding is successful in response to the second through P-th syndrome symbols matching the second through P-th estimated syndrome symbols, respectively, and may provide the control logic 470 with a decoding flag DF13 indicating the first ECC decoding is successful.

The single symbol error corrector 456 may be configured to correct an error of the target symbol based on the comparison signal CS and the first syndrome symbol $S_0$ and may be configured to output a user data set C_SDQ1 including the corrected target symbol $ri^C$.

The single symbol error corrector 456, in response to the comparison signal CS indicating that the second through P-th syndrome symbols match the second through P-th estimated syndrome symbols, respectively, may be configured to generate the corrected target symbol $ri^C$ by adding the first syndrome symbol $S_0$ to the estimated target symbol ri, and may be configured to output the user data set C_SDQ1 including the corrected target symbol $ri^C$.

In FIG. 16, embodiments are described in which the second syndrome symbol $S_1$ is used as the selected syndrome symbol. When the third syndrome symbol $S_2$ is used as the selected syndrome symbol, the error magnitude and symbol position estimator 451 may be configured to estimate position information i of a target matrix element as the position of the target symbol when the target matrix element $\alpha^i$ corresponding to a ratio of the selected syndrome symbol $S_2$ to the first syndrome symbol $S_0$ exists in a selected row $\alpha^2$, $\alpha^4$, . . . , $\alpha^{2N}$ corresponding to the selected syndrome symbol $S_2$ from among the plurality of rows in the transposition matrix $PCM^T$ in FIG. 9.

That is, the error magnitude and symbol position estimator 451 may be configured to use one of the second through P-th syndrome symbols $S_1$, $S_2$, $S_3$, . . . , $S_{P-1}$ as the selected syndrome symbol and may be configured to estimate position information i of a target matrix element as the position of the target symbol when the target matrix element $\alpha^i$ corresponding to a ratio of the selected syndrome symbol to the first syndrome symbol $S_0$ exists in a selected row corresponding to the selected syndrome symbol from among the plurality of rows in the transposition matrix $PCM^T$ in FIG. 9.

Figure 17:
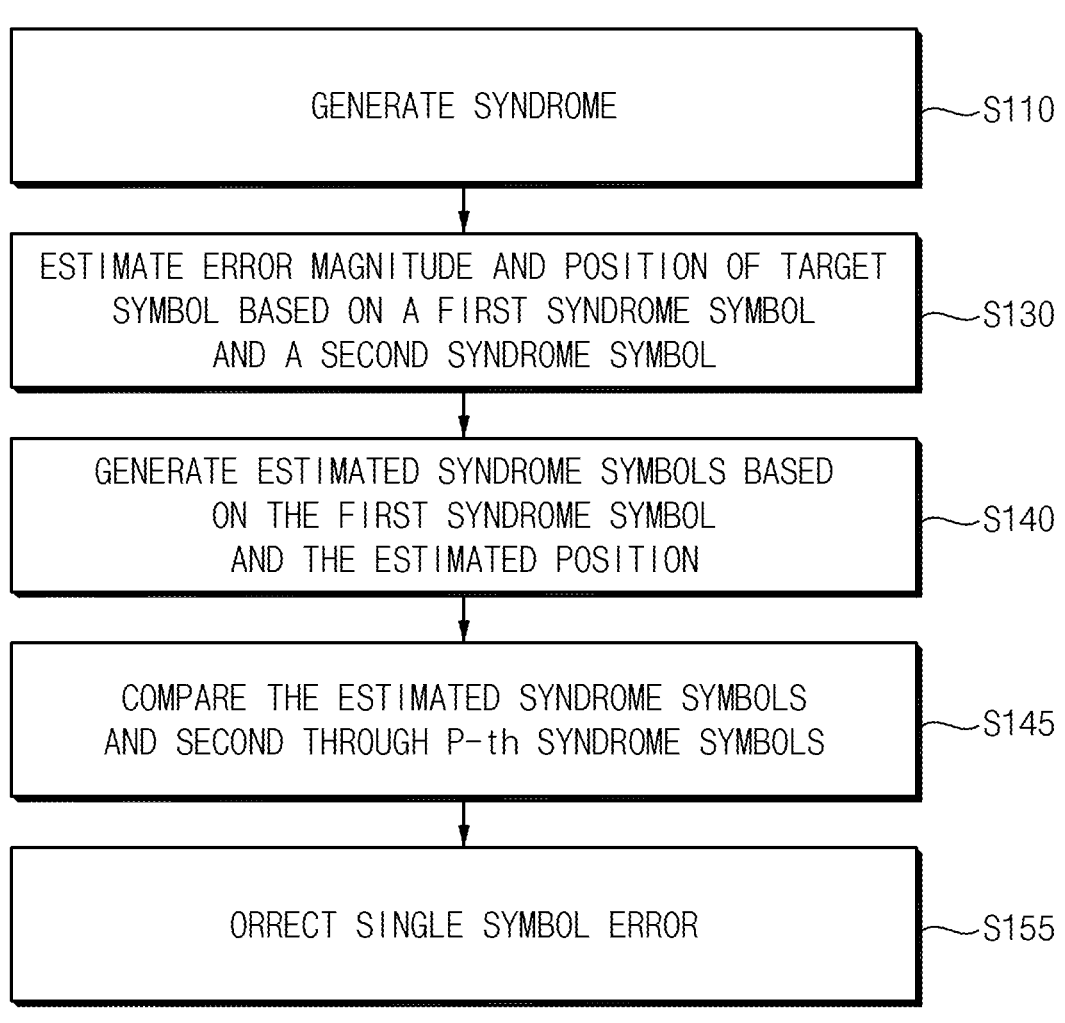
FIG. 17 illustrates an example operation of the single symbol correction circuit of FIG. 16 according to example embodiments.

FIG. 17 illustrates an example operation of the single symbol correction circuit of FIG. 16 according to example embodiments.

In FIG. 17, operation of the syndrome generator 440 in FIG. 13 is also illustrated for convenience of description.

Referring to FIGS. 13, 16 and 17, the syndrome generator 440 may be configured to generate the syndrome SDR including the first through P-th syndrome symbols $S_0$, $S_1$, $S_2$, $S_3$, . . . , $S_{P-1}$ by performing a matrix-multiplication operation on the transposition matrix $PCM^T$ of the parity check matrix PCM and the vector representation R of the read codeword set SCW2 as illustrated in FIG. 9 (operation S110).

The single symbol correction circuit $450ab$ may estimate the error magnitude and the position of a target symbol in which an error exists based on the first syndrome symbol $S_0$ and the selected syndrome symbol $S_1$ (i.e., the second syndrome symbol) corresponding to one of the second through P-th syndrome symbols $S_1$, $S_2$, $S_3$, . . . , $S_{P-1}$ (operation S130).

The single symbol correction circuit $450ab$ may generate the estimated syndrome SDR_T by performing operation based on the target matrix element $\alpha^1$ and the first syndrome symbol $S_0$ (operation S140).

The single symbol correction circuit $450ab$ may compare each of the second through P-th syndrome symbols of the syndrome SDR with corresponding ones of the second through P-th estimated syndrome symbols of the estimated syndrome SDR_T (operation S145).

The single symbol correction circuit $450ab$ may correct an error of the (estimated) target symbol ri based on a result of the comparison (operation S155) and may output the user data set C_SDQ1 including the corrected target symbol $ri^C$.

FIG. 18 is a block diagram illustrating an example of the multi symbol correction circuit in the ECC decoder of FIG. 13 according to example embodiments.

Referring to FIG. 18, the multi symbol correction circuit 480a may include a Berlekamp-Massey (BM) calculator 481, a chien search block 483, an error value estimator 485, a multi symbol error corrector 487 and a buffer 489. The error value estimator 485 may be referred to as Forney.

The BM calculator 481 may be configured to receive the syndrome SDR, may be configured to generate coefficients of an error locator polynomial ELP by performing a plurality of iterations based on the first trough P-th syndrome symbols of the syndrome SDR and may provide the coefficients of the error locator polynomial ELP to the chien search block 483.

The chien search block 483 may be configured to search positions of symbol errors based on the coefficients of the error locator polynomial ELP and may provide an error position signal EPS to the error value estimator 485.

The error value estimator 485 may be configured to estimate error values based on the error position signal indicating positions of the symbol errors and may be configured to provide estimated error value EV to the multi symbol error corrector 487.

The buffer 498 may be configured to receive the read codeword set SCW2, may be configured to temporarily store the read codeword set SCW2 and may be configured to provide the read codeword set SCW2 to the multi symbol error corrector 487.

The multi symbol error corrector 487 may be configured to correct the symbol errors in the read codeword set SCW2 based on the estimated error values EV and may be configured to output a corrected user data set C_SDQ2.

Because the BM calculator 481 calculates the coefficients of the error locator polynomial ELP by performing a plurality of iterations based on the first trough P-th syndrome symbols of the syndrome SDR, a decoding latency may be increased. The plurality of iterations may correspond to a number of the parity symbols. However, the multi symbol correction circuit 480a may be configured to reduce decoding latency because the multi symbol correction circuit 480a operates in parallel with the single symbol correction circuit 450a to perform the second ECC decoding and terminates the second ECC decoding in response to the termination signal TER from the control logic 470 in FIG. 13 when the first ECC decoding by the single symbol correction circuit 450a is successful.

Figure 19:
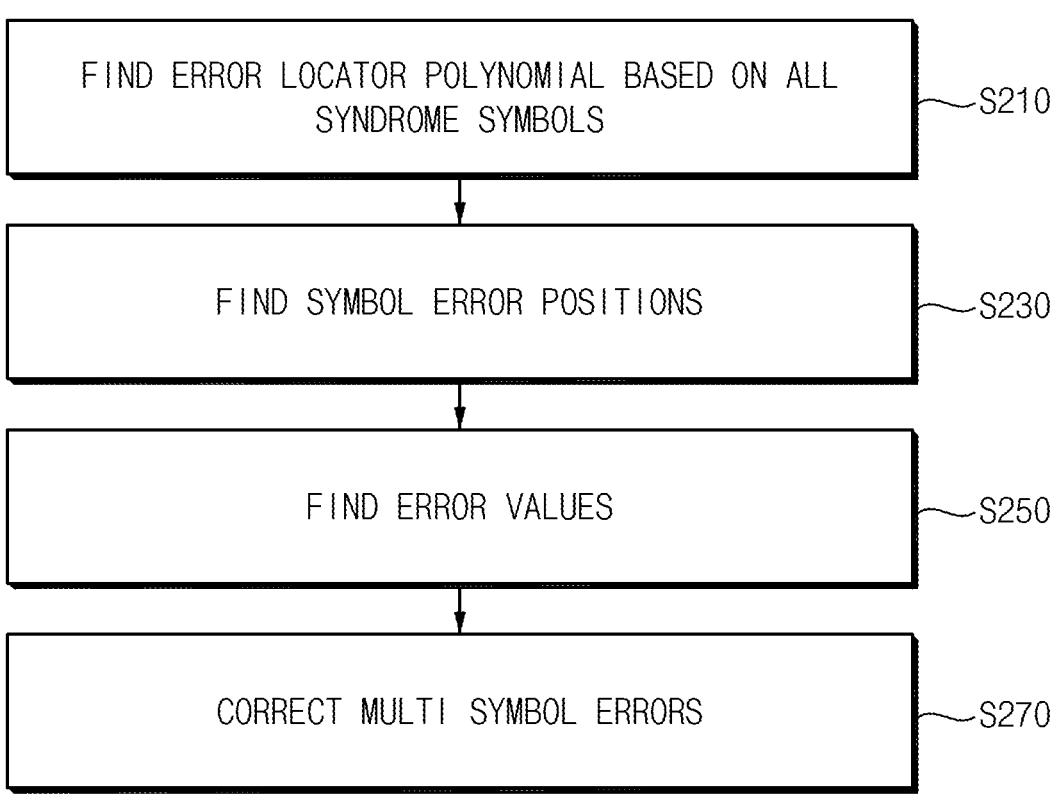
FIG. 19 illustrates an example operation of the multi symbol correction circuit of FIG. 18 according to example embodiments.

FIG. 19 illustrates an example operation of the multi symbol correction circuit of FIG. 18 according to example embodiments.

Referring to FIGS. 18 and 19, the multi symbol correction circuit 480a receives the syndrome SDR and finds or generates the error locator polynomial ELP by performing a plurality of iterations based on the first trough P-th syndrome symbols of the syndrome SDR (operation S210). That is, the multi symbol correction circuit 480a may generate the coefficients of the error locator polynomial ELP.

The multi symbol correction circuit 480a finds (i.e., searches) the symbol error positions based on the coefficients of the error locator polynomial ELP (operation S230), finds (i.e., estimates) error values based on the positions of the symbol errors (operation S250), corrects multi symbol errors based on the error values (operation S270) and outputs the corrected user data set C_SDQ2.

Figure 20:
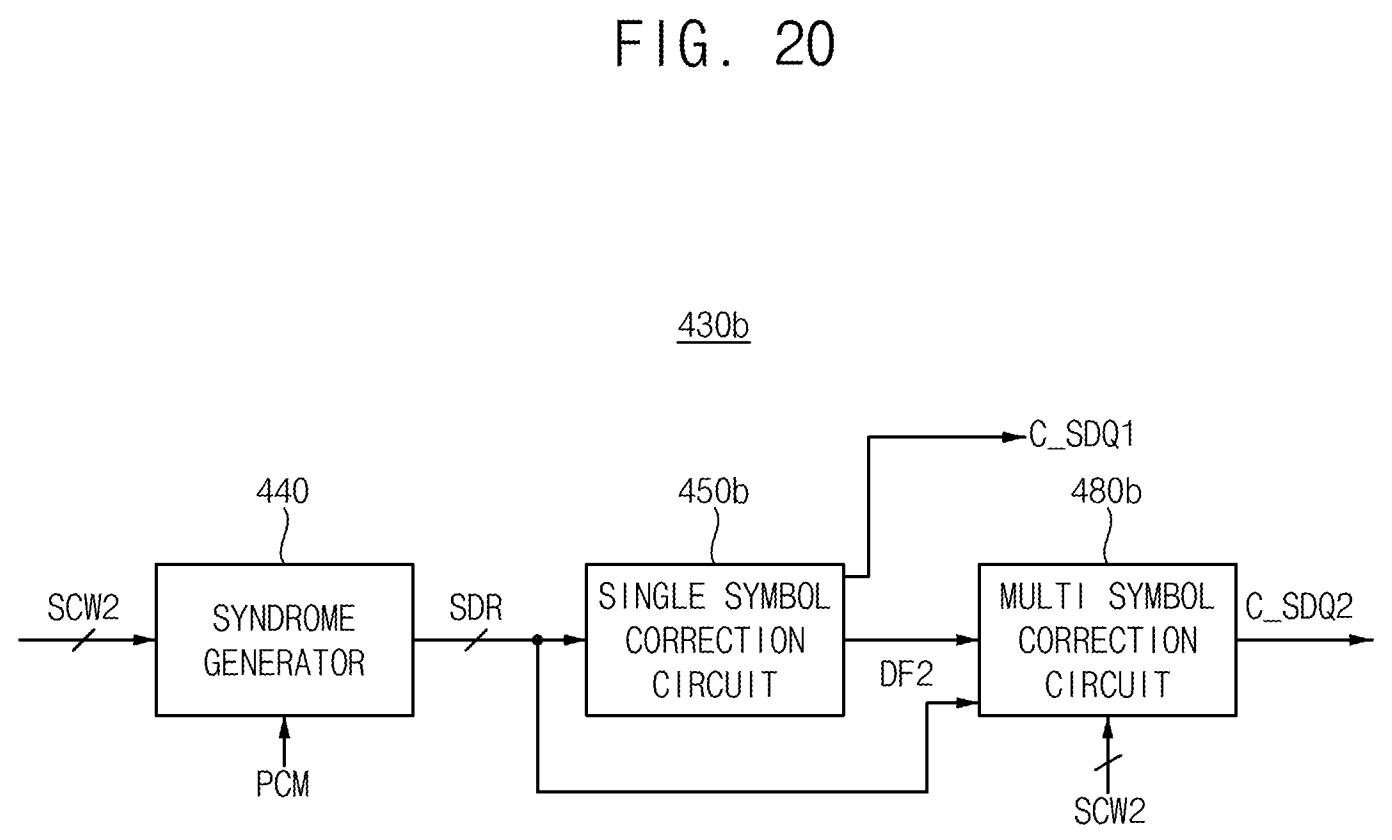

FIG. 20 is a block diagram illustrating an example of the ECC decoder in the ECC engine of FIG. 6 according to example embodiments.

Referring to FIG. 20, an ECC decoder 430b may include a syndrome generator 440, a single symbol correction circuit 450b and a multi symbol correction circuit 480b.

The syndrome generator 440 may be configured to generate the syndrome SDR by performing a matrix-multiplication operation on the read codeword set SCW2 and the transposition matrix $PCM^T$ of the parity check matrix PCM and may provide the syndrome SDR to the single symbol correction circuit 450b and the multi symbol correction circuit 480b.

That is, the syndrome generator 440 may be configured to generate a syndrome SDR including the first through P-th syndrome symbols $S_0$, $S_1$, $S_2$, $S_3$, . . . , $S_{P-1}$ by performing a matrix-multiplication operation on the transposition matrix $PCM^T$ of the parity check matrix PCM and the vector representation R of the read codeword set SCW2 as illustrated in FIG. 9 and may be configured to provide the syndrome SDR to the single symbol correction circuit 450b and the multi symbol correction circuit 480b.

The single symbol correction circuit 450b may be configured to receive the syndrome SDR and the read codeword set SCW2, may be configured to perform a first ECC decoding to correct a single symbol error in the read codeword set SCW2 by using (i.e., based on) a portion of the first through P-th syndrome symbols $S_0$, $S_1$, $S_2$, $S_3$, . . . , $S_{P-1}$ to output a corrected user data set C_SDQ1 and may provide the multi symbol correction circuit 480b with a decoding flag DF2 indicating whether the first ECC decoding is successful.

The multi symbol correction circuit 480b may be configured to receive the syndrome SDR and the read codeword set SCW2, may be configured to operate in response to the decoding flag DF2 indicating that the first ECC decoding fails and may perform a second ECC decoding to correct multi symbol errors in the read codeword set SCW2 by using (i.e., based on) all of the first through P-th syndrome symbols $S_0$, $S_1$, $S_2$, $S_3$, . . . , $S_{P-1}$ to output a corrected user data set C_SDQ2.

The single symbol correction circuit 450b and the multi symbol correction circuit 480b may be configured to operate sequentially or in series. That is, the first ECC decoding by the single symbol correction circuit 450b and the second ECC decoding by the multi symbol correction circuit 480b may be performed sequentially or in series.

Therefore, when the single symbol error exists in the read codeword set SCW2 and the single symbol correction circuit 450b correct the single symbol error, the second ECC decoding by the multi symbol correction circuit 480b may not be started and thus the ECC decoder 430b may reduce decoding latency corresponding to a time interval required for correcting symbol error.

In addition, when the multi symbol error exists in the read codeword set SCW2 and the first ECC decoding by the single symbol correction circuit 450b fails, the multi symbol correction circuit 480b performs the second ECC decoding to output the corrected user data set C_SDQ2.

The single symbol correction circuit 450b may use one of the single symbol correction circuit 450aa of FIG. 14 and the single symbol correction circuit 450ab of FIG. 16 and the multi symbol correction circuit 480b may use the multi symbol correction circuit 480a of FIG. 18.

Therefore, the single symbol correction circuit 450b may be configured to use one of the second through P-th syndrome symbols $S_1, S_2, S_3, \ldots, S_{P-1}$ as the selected syndrome symbol, may be configured to estimate position information i of a target matrix element as the position of the target symbol when the target matrix element $\alpha^i$ corresponding to a ratio of the selected syndrome symbol to the first syndrome symbol $S_0$ exists in a selected row corresponding to the selected syndrome symbol from among the plurality of rows in the transposition matrix $PCM^T$ in FIG. 9, may be configured to correct an error of the (estimated) target symbol ri based on the first syndrome symbol $S_0$, may be configured to perform a matrix-multiplication operation on the transposition matrix $PCM^T$ and a codeword set including the corrected target symbol $ri^C$ to generate the check syndrome S' of FIG. 12 and may be configured to verify or check whether the single symbol error is corrected based on whether all values of the first through P-th check syndrome symbols $S_0', S_1', S_2', S_3', \ldots, S_{P-1}'$ of the check syndrome S' is zero.

In other embodiments, the single symbol correction circuit 450b may be configured to use one of the second through P-th syndrome symbols $S_1, S_2, S_3, \ldots, S_{P-1}$ as the selected syndrome symbol, may be configured to estimate position information i of a target matrix element as the position of the target symbol when the target matrix element $\alpha^i$ corresponding to a ratio of the selected syndrome symbol to the first syndrome symbol $S_0$ exists in a selected row corresponding to the selected syndrome symbol from among the plurality of rows in the transposition matrix $PCM^T$ in FIG. 9, may be configured to generate the estimated syndrome SDR_T by performing operation based on the target matrix element $\alpha^i$ and the first syndrome symbol $S_0$, may be configured to compare the second through P-th syndrome symbols of the syndrome SDR with the second through P-th estimated syndrome symbols of the estimated syndrome SDR_T, respectively, and may be configured to correct an error of the (estimated) target symbol ri based on a result of the comparison.

The multi symbol correction circuit 480, when the first ECC decoding fails, may be configured to find (i.e., search) the symbol error positions based on the coefficients of the error locator polynomial ELP, may be configured to find (i.e., estimate) error values based on the positions of the symbol errors, and may be configured to correct multi symbol errors in the read codeword set SCW2 based on the error values.

Figure 21:
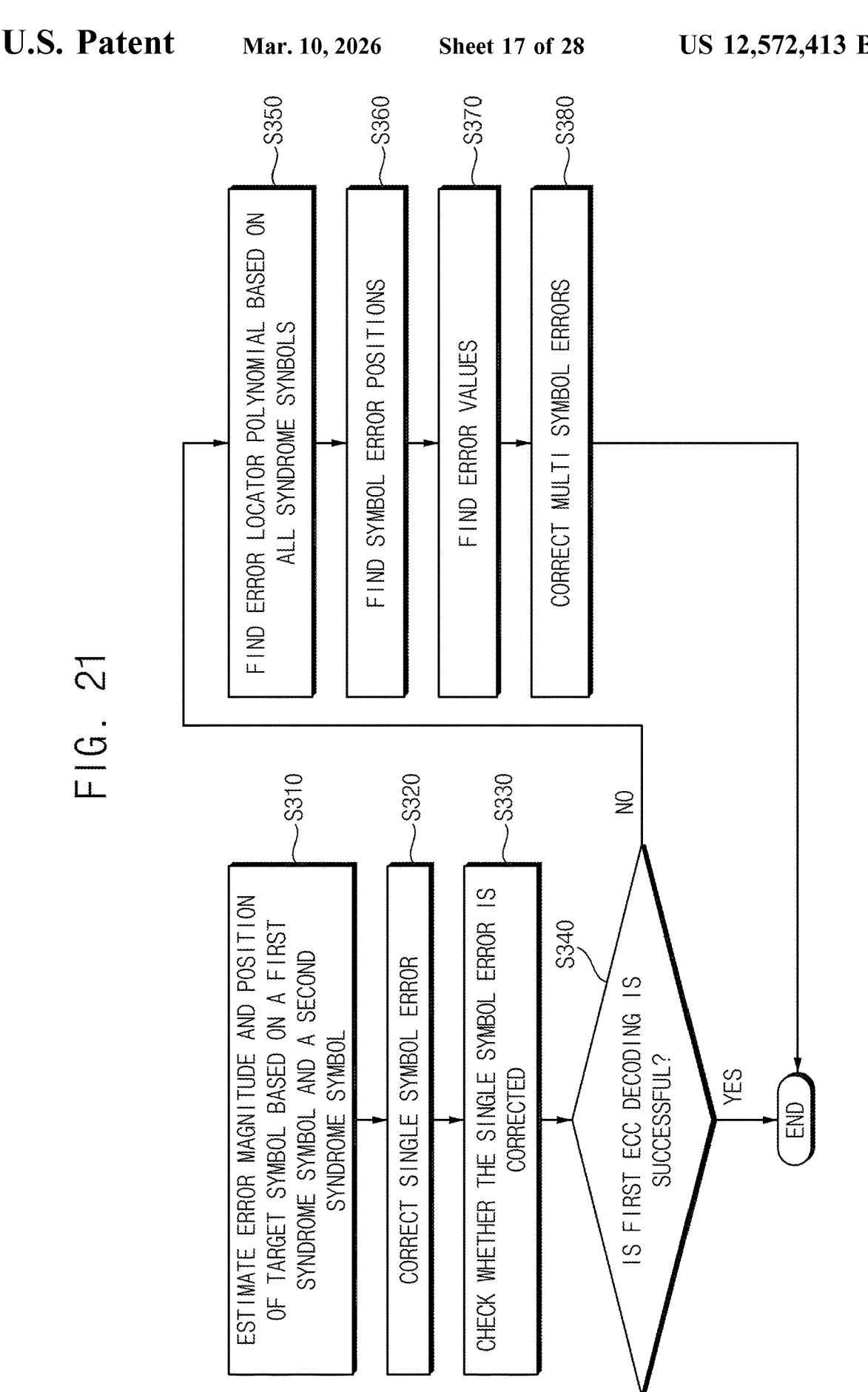
FIG. 21 illustrates an example operation of the ECC decoder of FIG. 20 according to example embodiments.

FIG. 21 illustrates an example operation of the ECC decoder of FIG. 20 according to example embodiments.

In FIG. 21, example embodiments are based on the single symbol correction circuit 450b using the single symbol correction circuit 450aa of FIG. 14 and the multi symbol correction circuit 480b using the multi symbol correction circuit 480a of FIG. 18.

Referring to FIGS. 14, 18, 20 and 21, the single symbol correction circuit 450b may estimate the error magnitude and the position of a target symbol in which an error exists based on the first syndrome symbol $S_0$ and the selected syndrome symbol $S_1$ (i.e., the second syndrome symbol) corresponding to one of the second through P-th syndrome symbols $S_1, S_2, S_3, \ldots, S_{P-1}$ (operation S310).

The single symbol correction circuit 450b may correct an error of the (estimated) target symbol ri based on the first syndrome symbol $S_0$ (operation S320).

The single symbol correction circuit 450b may perform a matrix-multiplication operation on the transposition matrix $PCM^T$ and a codeword set including the corrected target symbol $ri^C$ to generate the check syndrome S' of FIG. 12 and may check whether the single symbol error is corrected based on whether all values of the first through P-th check syndrome symbols $S_0', S_1', S_2', S_3', \ldots, S_{P-1}'$ of the check syndrome S' is zero (operation S330).

The single symbol correction circuit 450b may determine whether the first ECC decoding is successful based on whether the single symbol error is corrected (operation S340). When the first ECC decoding is successful (YES in S340), the ECC decoder 430b finishes an ECC decoding.

When the first ECC decoding fails (NO in S340), the multi symbol correction circuit 480a may operate in response to the decoding flag DF2, may generate coefficients of an error locator polynomial ELP by performing a plurality of iterations based on the first trough P-th syndrome symbols of the syndrome SDR (operation S350), may search positions of symbol errors based on the coefficients of the error locator polynomial ELP (operation S360), may estimate error values based on the error position signal indicating positions of the symbol errors (operation S370), may correct the symbol errors in the read codeword set SCW2 based on the estimated error values (operation S380) and may output a corrected user data set C_SDQ2.

FIG. 22 illustrates an example operation of the ECC decoder of FIG. 20 according to example embodiments.

In FIG. 22, example embodiments are based on the single symbol correction circuit 450b using the single symbol correction circuit 450ab of FIG. 16 and the multi symbol correction circuit 480b using the multi symbol correction circuit 480a of FIG. 18.

Referring to FIGS. 16, 18, 20 and 22, the single symbol correction circuit 450b may estimate the error magnitude and the position of a target symbol in which an error exists based on the first syndrome symbol $S_0$ and the selected syndrome symbol $S_1$ (i.e., the second syndrome symbol) corresponding to one of the second through P-th syndrome symbols $S_1, S_2, S_3, \ldots, S_{P-1}$ (operation S310).

The single symbol correction circuit 450b may generate the estimated syndrome SDR_T by performing an operation based on the target matrix element $\alpha_i$ and the first syndrome symbol $S_0$ (operation S315). The single symbol correction circuit 450b may compare the second through P-th syndrome symbols of the syndrome SDR with the second through P-th estimated syndrome symbols of the estimated syndrome SDR_T, respectively (operation S325). The single symbol correction circuit 450b may correct an error of the (estimated) target symbol ri based on a result of the comparison (operation S335).

The single symbol correction circuit 450b may determine whether the first ECC decoding is successful based on whether the single symbol error is corrected (operation S340). When the first ECC decoding is successful (YES in S340), the ECC decoder 430b finishes an ECC decoding.

When the first ECC decoding fails (NO in S340), the multi symbol correction circuit 480a may operate in response to the decoding flag DF2, may generate coefficients of an error locator polynomial ELP by performing a plurality of iterations based on the first trough P-th syndrome symbols of the syndrome SDR (operation S350), may search positions of symbol errors based on the coefficients of the error locator polynomial ELP (operation S360), may estimate error values based on the error position signal indicating positions of the symbol errors (operation S370), may correct the symbol errors in the read codeword set SCW2 based on the estimated error values (operation S380) and may output a corrected user data set C_SDQ2.

Figure 23:
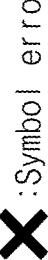
Figure 24:
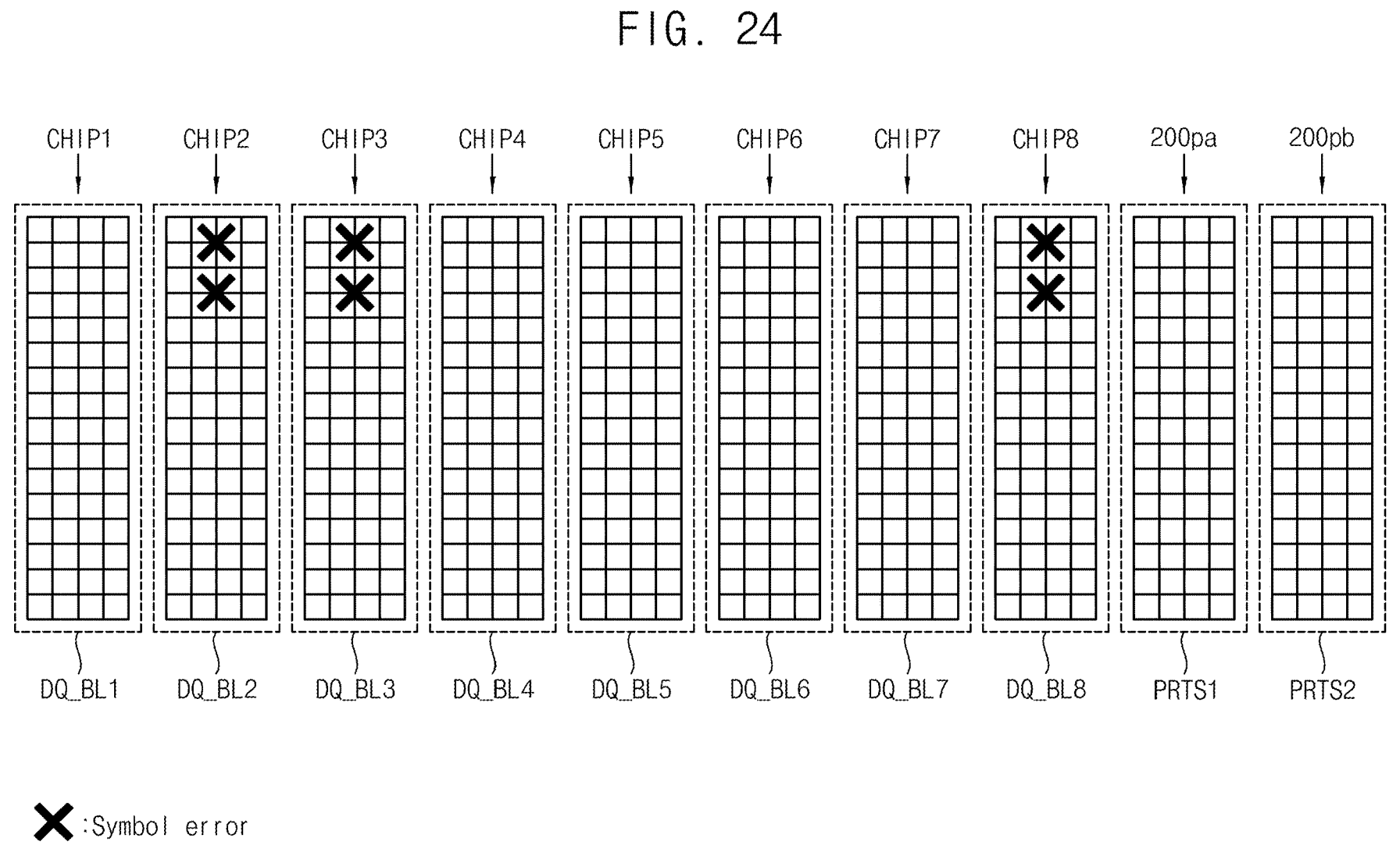

FIGS. 23 and 24 illustrate various types of errors, which the ECC decoder may correct according to example embodiments.

In FIGS. 23 and 24, assuming that chips CHIP1~CHIP8 correspond to the data chip 200a~200g in FIG. 3, each of the chips CHIP1~CHIP8 outputs respective one of data sets DQ_BL1~DQ_BL8, the first parity chip 200pa outputs the first parity data PRTS1 and the second parity chip 200pb outputs the second parity data PRTS2.

In addition, assuming that each of the first parity data PRTS1 and the second parity data PRTS2 includes eight parity symbols, the ECC decoder 430 corrects a random symbol error by using two parity symbols and the ECC decoder 430 corrects a symbol error of which the error position is known by using one parity symbol.

In addition, in FIGS. 23 and 24, X denotes a symbol error which occurs in data by symbol basis.

Referring to FIG. 23, when the data set DQ_BL2, output from the chips CHIP2, includes one symbol error, the single symbol correction circuit 450a in FIG. 13 may output the corrected user data set C_SDQ1 by correcting one symbol error, and may provide the control logic 470 with the decoding flag DF1 indicating that the first ECC decoding is successful. The control logic 470 may terminate an operation of the multi symbol correction circuit 480a by providing the termination signal TER to the multi symbol correction circuit 480a in response to the decoding flag DF1.

In other embodiments, the single symbol correction circuit 450b in FIG. 20 may output the corrected user data set C_SDQ1 by correcting one symbol error, and may provide the multi symbol correction circuit 480b with the decoding flag DF2 indicating that the first ECC decoding is successful. The multi symbol correction circuit 480b may not start the second ECC decoding in response to the decoding flag DF2.

Referring to FIG. 24, when each of the data sets DQ_BL2, DQBL3 and DQ_BL8 output from the data chips CHIP2, CHIP3 and CHIP8 includes two symbol errors. Because the single symbol correction circuit 450a in FIG. 13 cannot correct the multi symbol errors, the single symbol correction circuit 450a may provide the control logic 470 with the decoding flag DF2 indicating that the first ECC decoding fails. The control logic 470 may maintain or start an operation of the multi symbol correction circuit 480a by providing the termination signal TER to the multi symbol correction circuit 480a in response to the decoding flag DF2. The multi symbol correction circuit 480a may output the corrected user data set C_SDQ2 by correcting the multi symbol errors in the data chips CHIP2, CHIP3 and CHIPS based on the first through P-th syndrome symbols.

In other embodiments, the single symbol correction circuit 450b in FIG. 20 cannot correct the multi symbol errors, the single symbol correction circuit 450b may provide the control logic 470 with the decoding flag DF2 indicating that the first ECC decoding fails. The control logic 470 may maintain or start an operation of the multi symbol correction circuit 480a by providing the termination signal TER to the multi symbol correction circuit 480a in response to the decoding flag DF2. The multi symbol correction circuit 480b may output the corrected user data set C_SDQ2 by correcting the multi symbol errors in the data chips CHIP2, CHIP3 and CHIP8 based on the first through P-th syndrome symbols.

Therefore, the ECC engine 400 according to example embodiments, may have correction capability with respect to a plurality of syndrome symbols, may perform a first ECC decoding to correct a single symbol error in a read codeword set rapidly, which is read from a memory module by using a portion of syndrome symbols and may perform a second ECC decoding to correct multi symbol errors, by using all of the syndrome symbols, in parallel with the first ECC decoding or after the first ECC decoding, when the first ECC decoding fails. Accordingly, the ECC engine 400 may reduce decoding latency.

Figure 25:
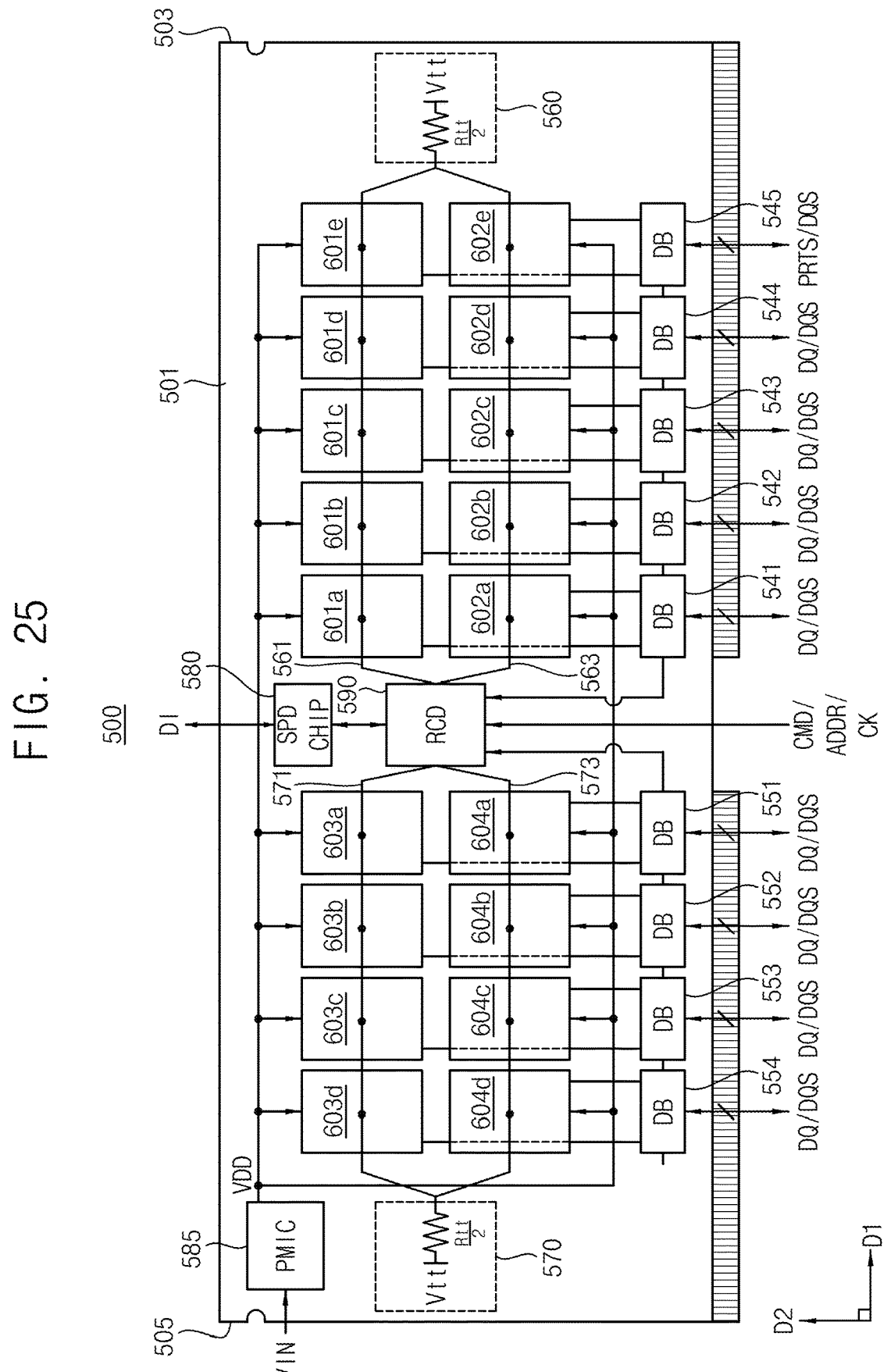
FIG. 25 is a block diagram illustrating a memory module that may be used in a memory system according to example embodiments.

FIG. 25 is a block diagram illustrating a memory module that may be used by the memory system according to example embodiments.

Referring to FIG. 25, a memory module 500 may include a registered clock driver (RCD) 590 disposed in or mounted on a circuit board 501, a plurality of semiconductor memory devices 601a~601e, 602a~602e, 603a~603d, and 604a~604d, a plurality of data buffers 541~545 and 551~554, module resistance units 560 and 570, the serial present detect (SPD) chip 580, and a power management integrated circuit (PMIC) 585.

The RCD 590 may be configured to control the semiconductor memory devices 601a~601e, 602a~602e, 603a~603d, and 604a~604d and the PMIC 585 under control of the memory controller 100. For example, the RCD 590 may be configured to receive an address ADDR, a command CMD, and a clock signal CK from the memory controller 100.

The SPD chip 580 may be a programmable read only memory (e.g., EEPROM). The SPD chip 580 may include initial information or device information DI of the memory module 500. In example embodiments, the SPD chip 580 may include the initial information or the device information DI, such as a module form, a module configuration, a storage capacity, a module type, an execution environment, or the like of the memory module 500.

When a memory system including the memory module 500 is booted up, the memory controller 100 may be configured to read the device information DI from the SPD chip 580 and may be configured to recognize the memory module 500 based on the device information DI. The memory controller 100 may be configured to control the memory module 500 based on the device information DI from the SPD chip 580. For example, the memory controller 100 may be configured to recognize a type of the semiconductor memory devices included in the memory module 500 based on the device information DI from the SPD chip 580.

Here, the circuit board 501 which is a printed circuit board may extend in a first direction D1, perpendicular to a second direction D2, between a first edge portion 503 and a second edge portion 505. The first edge portion 503 and the second edge portion 105 may extend in the second direction D2.

The RCD 590 may be disposed on a center of the circuit board 501. The plurality of semiconductor memory devices 601a~601e, 602a~602e, 603a~603d, and 604a~604d may be arranged in a plurality of rows between the RCD 590 and the first edge portion 503 and between the control device 590 and the second edge portion 505.

In this case, the semiconductor memory devices 601a~601e and 602a~602e may be arranged along a plurality of rows between the RCD 590 and the first edge portion 503. The semiconductor memory devices 603a~603d, and 604a~604d may be arranged along a plurality of rows between the RCD 590 and the second edge portion 505. The semiconductor memory devices 601a~601d, 602a~602d, 603a~603d, and 604a~604d may be referred to data chip and the semiconductor memory devices 601e and 602e may be referred to as first and second parity chips respectively.

Each of the plurality of semiconductor memory devices 601a~601d, 602a~602d, 603a~603d, and 604a~604d may be coupled to a corresponding one of the data buffers 541~544 and 551~554 through a data transmission line for receiving/transmitting data signal DQ and data strobe signal DQS. Each of the semiconductor memory devices 601e and 602e may be coupled to the data buffer 545 through a data transmission line for receiving/transmitting parity data PRTS and the data strobe signal DQS, The RCD 590 may be configured to provide a command/address signal (e.g., CA) to the semiconductor memory devices 601a~601e through a command/address transmission line 561 and may be configured to provide a command/address signal to the semiconductor memory devices 602a~602e through a command/address transmission line 563.

In addition, the RCD 590 may be configured to provide a command/address signal to the semiconductor memory devices 603a~603d through a command/address transmission line 571 and may provide a command/address signal to the semiconductor memory devices 604a~604d through a command/address transmission line 573.

The command/address transmission lines 561 and 563 may be connected in common to the module resistance unit 560 disposed to be adjacent to the first edge portion 503, and the command/address transmission lines 571 and 573 may be connected in common to the module resistance unit 570 disposed to be adjacent to the second edge portion 505.

Each of the module resistance units 560 and 570 may include a termination resistor Rtt/2 connected to a termination voltage Vtt. In this case, an arrangement of the module resistance units 560 and 570 may reduce the number of the module resistance units, thus reducing an area where termination resistors are disposed.

In addition, each of the plurality of semiconductor memory devices 601a~601e, 602a~602e, 603a~603d, and 604a~604d may be a DRAM device.

The SPD chip 580 is disposed to be adjacent to the RCD 590 and the PMIC 585 may be disposed between the semiconductor memory device 603d and the second edge portion 505. The PMIC 585 may generate a power supply voltage VDD based on an input voltage VIN and may provide the power supply voltage VDD to the semiconductor memory devices 601a~601e, 602a~602e, 603a~603d, and 604a~604d.

Although the PMIC 585 is disposed to be adjacent to the second edge portion 505 in the example of FIG. 25, the PMIC 585 may be disposed in a central portion of the circuit board 501 to be adjacent to the RCD 590 in other example embodiments.

Figure 26:
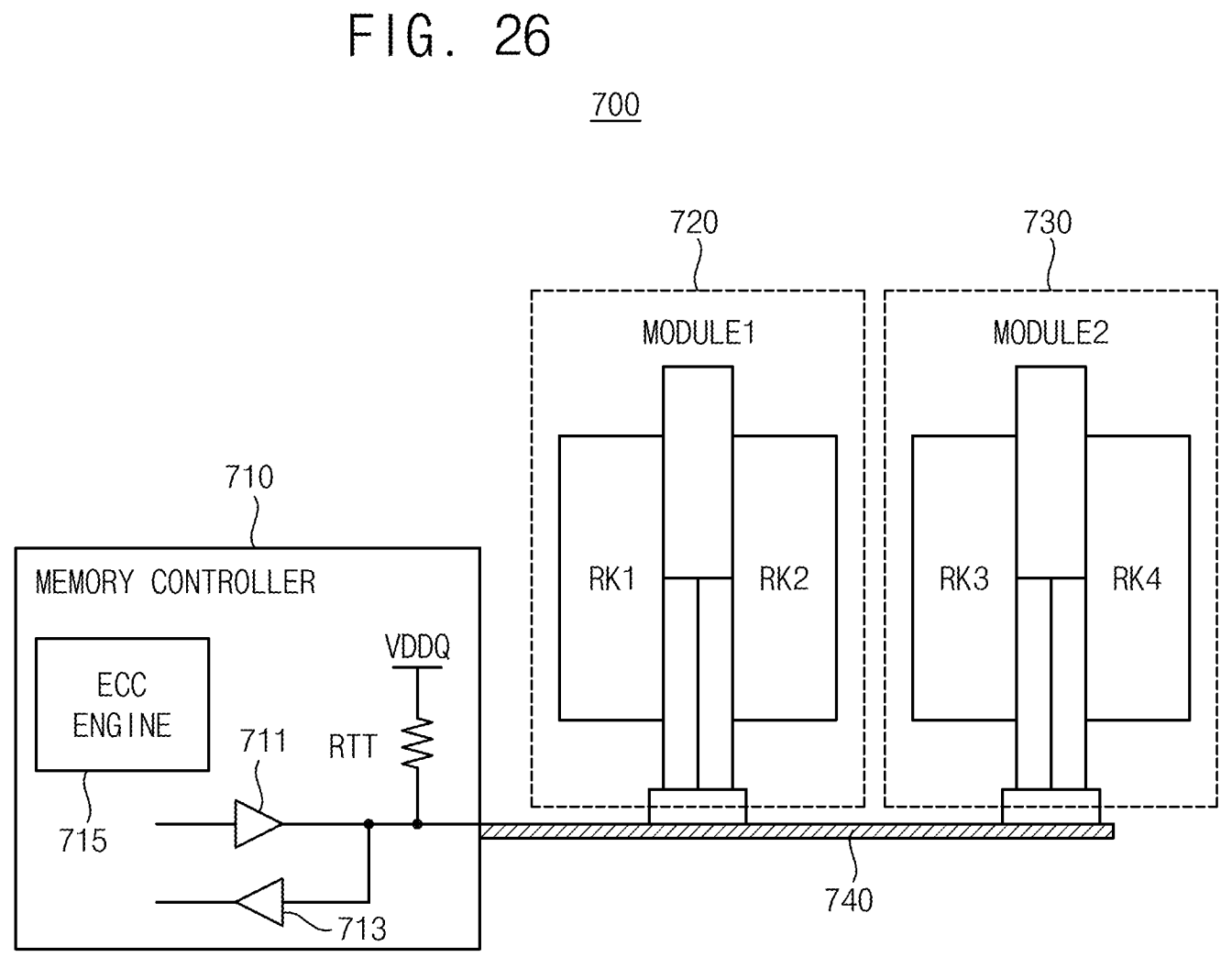

FIG. 26 is a block diagram illustrating a memory system having quad-rank memory modules according to example embodiments.

Referring to FIG. 26, a memory system 700 may include a memory controller 710 and at least one or more memory modules 720 and 730.

The memory controller 710 may be configured to control a memory module 720 and/or 730 to perform a command supplied from a processor or host. The memory controller 710 may be implemented in a processor or host, or may be implemented with an application processor or a system-on-a-chip (SoC). The memory controller 710 may include a transmitter 711, to transmit a signal to the at least one or more memory modules 720 and 730, and a receiver 713 to receive a signal from the at least one or more memory modules 720 and 730. For signal integrity, a source termination may be implemented with a resistor RTT on a bus 740 of the memory controller 710. The resistor RTT may be coupled to a power supply voltage VDDQ. The memory controller 710 may include an ECC engine 715 and the ECC engine 715 may use the ECC engine 400 of FIG. 6.

Therefore, the ECC engine 715 may include an ECC encoder and an ECC decoder. The ECC decoder may be configured to have correction capability with respect to a plurality of syndrome symbols, may be configured to perform a first ECC decoding to correct a single symbol error in a read codeword set rapidly, which is read from the one or more memory modules 720 and 730 by using a portion of syndrome symbols and may be configured to perform a second ECC decoding to correct multi symbol errors, by using all of the syndrome symbols, in parallel with the first ECC decoding or after the first ECC decoding, when the first ECC decoding fails. Accordingly, the ECC engine 715 may reduce decoding latency.

The at least one or more memory modules 720 and 730 may be referred to as a first memory module 720 and a second memory module 730. The first memory module 720 and the second memory module 730 may be coupled to the memory controller 710 through the bus 740. Each of the first memory module 720 and the second memory modules 730 may correspond to the memory module MM in FIG. 1. The first memory module 720 may include at least one or more memory ranks RK1 and RK2, and the second memory module 730 may include one or more memory ranks RK3 and RK4.

Each of the first memory module 720 and the second memory module 730 may include a plurality of data chips, a first parity chip, and a second parity chip.

Figure 27:
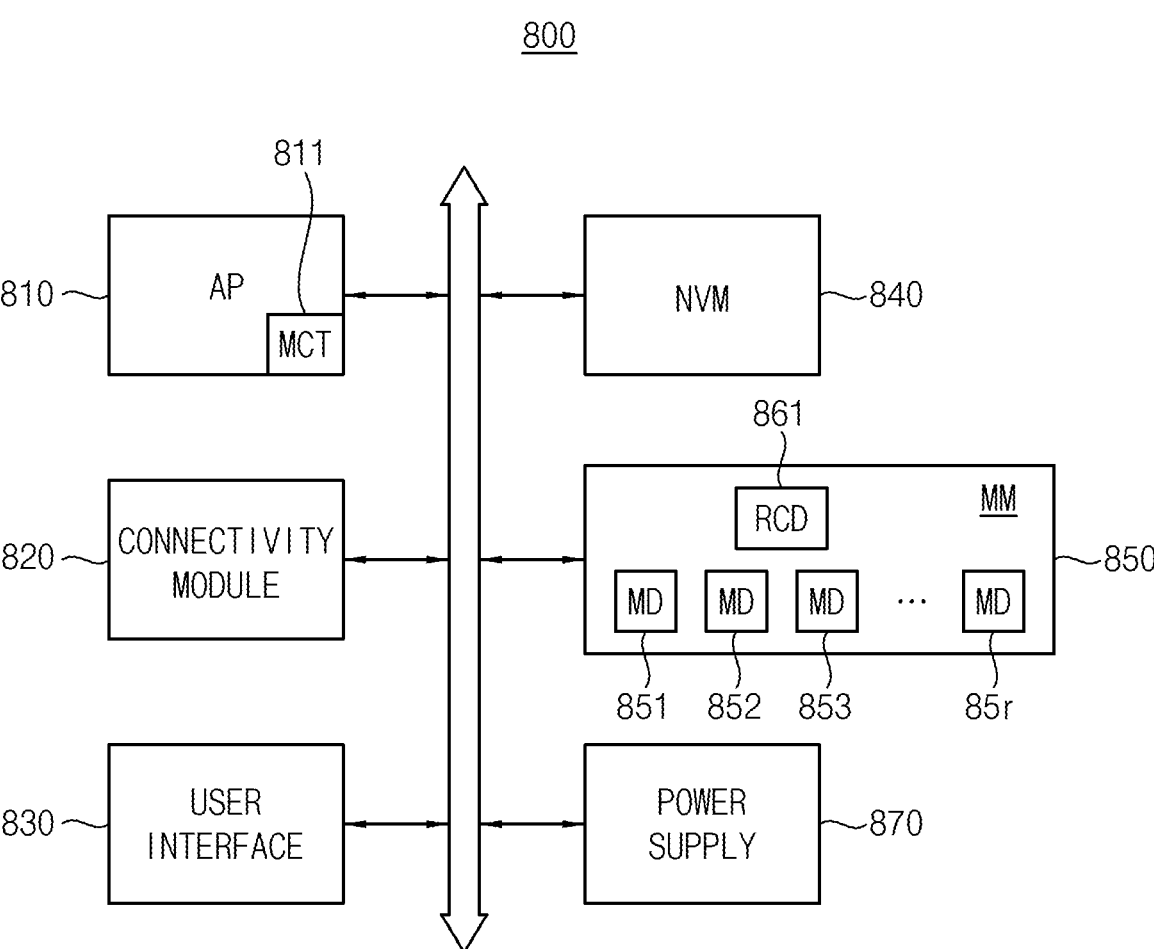
FIG. 27 is a block diagram illustrating a mobile system including a memory module according to example embodiments.

FIG. 27 is a block diagram illustrating a mobile system including a memory module according to example embodiments.

Referring to FIG. 27, a mobile system 800 may include an application processor 810, a connectivity module 820, a memory module MM 850, a nonvolatile memory device 840, a user interface 830, and a power supply 870. The application processor 810 may include a memory controller (MCT) 811. The memory controller 811 may include the ECC engine 400 of FIG. 6.

The application processor 810 may be configured to execute applications, such as a web browser, a game application, a video player, etc. The connectivity module 820 may perform wired or wireless communication with an external device.

The memory module 850 may be configured to store data processed by the application processor 810 or operate as a working memory. The memory module 850 may include a plurality of semiconductor memory devices MD 851, 852, 853, and 85r (where r is a positive integer greater than three), and an RCD 861.

The semiconductor memory devices 851, 852, 853, and 85r may include a plurality of data chips, a first parity chip, and a second parity chip. Therefore, the ECC engine in the memory controller 811 may be configured to have correction capability with respect to a plurality of syndrome symbols, may be configured to perform a first ECC decoding to correct a single symbol error in a read codeword set rapidly, which is read from the memory module 850 by using a portion of syndrome symbols and may be configured to perform a second ECC decoding to correct multi symbol errors, by using all of the syndrome symbols, in parallel with the first ECC decoding or after the first ECC decoding, when the first ECC decoding fails. Accordingly, the ECC engine may reduce decoding latency.

The nonvolatile memory device 840 may be configured to store a boot image for booting the mobile system 800. The user interface 830 may include at least one input device, such as a keypad, a touch screen, etc., and at least one output device, such as a speaker, a display device, etc. The power supply 870 may supply an operating voltage to the mobile system 800.

The mobile system 800 or components of the mobile system 800 may be mounted using various types of packages.

Figure 28:
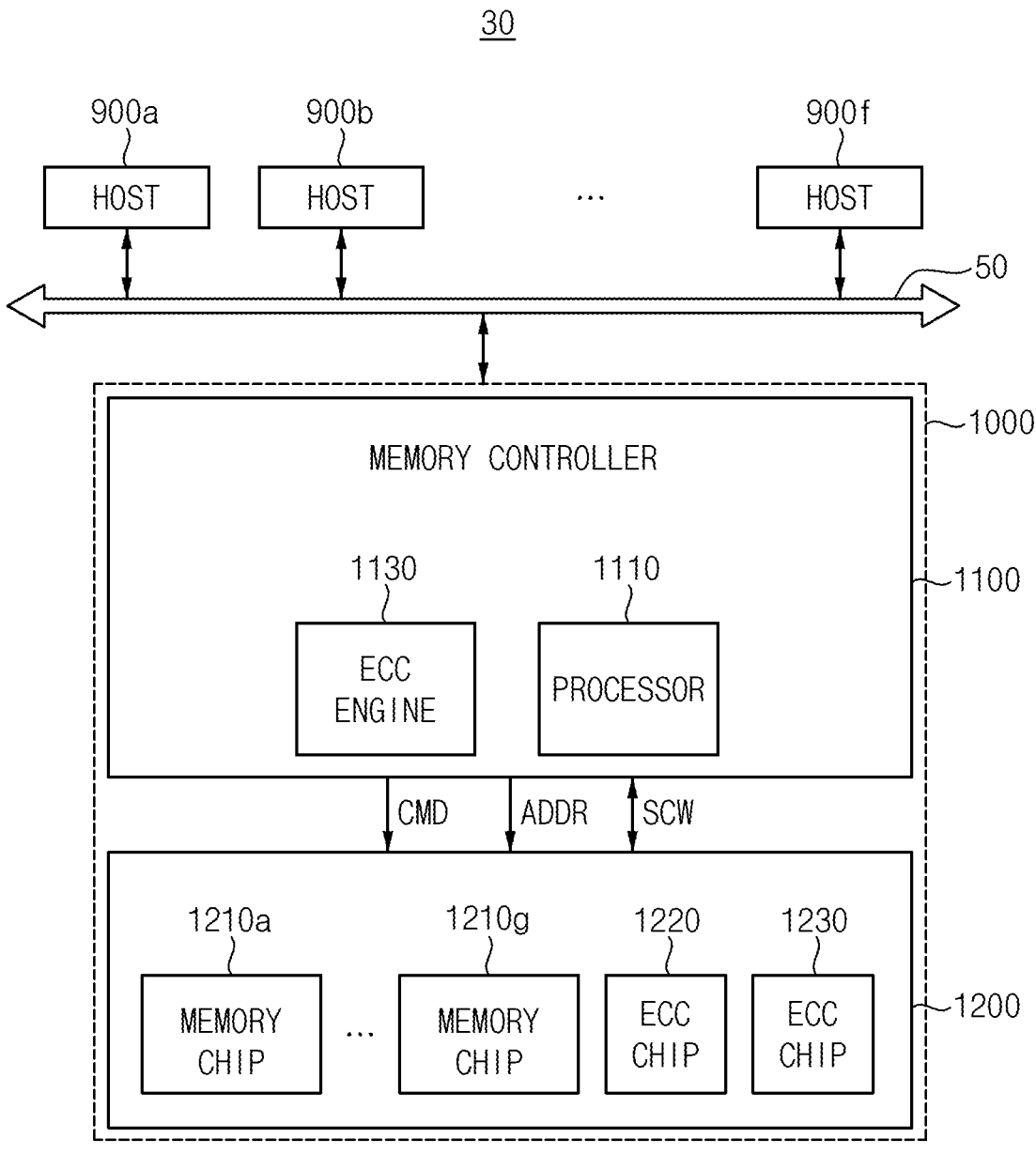
FIG. 28 is a block diagram illustrating a computing system according to example embodiments.

FIG. 28 is a block diagram illustrating a computing system according to example embodiments.

Referring to FIG. 28, a computing system 30 may include a plurality of hosts 900a, 900b, . . . , 900f and a memory system 1000 and the memory system 1000 may include a memory controller 1100 and a memory module 1200. Here, f is a natural number greater than two.

The memory module 1200 may include a plurality of data chips 1210a~1210g, a first parity chip 1220, and a second parity chip 1230. The first parity chip 1220 and the second parity chip 1230 may be referred to as an ECC chip.

The memory controller 1100 may be configured to apply a command CMD and an address ADDR to the memory module 1200, and may be configured to exchange a codeword set SCW with the memory module 1200. The memory controller 1100 may include a processor 1110 and an ECC engine 1130.

The processor 1110 may be configured to control overall operation of the memory controller 1100.

The ECC engine 1130 may be configured to perform an ECC encoding on a user data set to generate a parity data set and may provide the memory module 1200 with the codeword set SCW including the user data set and the parity data set in a write operation.

The ECC engine 1130, in a read operation, may be configured to perform a first ECC decoding to correct a single symbol error in a read codeword set rapidly, which is read from the memory module 1200 by using a portion of syndrome symbols and may be configured to perform a second ECC decoding to correct multi symbol errors, by using all of the syndrome symbols, in parallel with the first ECC decoding or after the first ECC decoding, when the first ECC decoding fails. Accordingly, the ECC engine 1130 may reduce decoding latency.

The memory controller 1100 may be connected to the plurality of hosts 900a, 900b, . . . , 900f through a compute express link (CXL) bus 50 and may control the plurality of data chips 1210a~1210g, the first parity chip 1220 and the second parity chip 1230 by communicating the plurality of hosts 900a, 900b, . . . , 900f through the CXL interface.

In some embodiments, the CXL bus 50 may be configured to support a plurality of CXL protocols and messages and/or data may be transmitted through the plurality of CXL protocols. For example, the plurality of CXL protocols may include a non-coherent protocol (or and I/O protocol CXL.io), a coherent protocol (or a cache protocol CXL-.cache), and a memory access protocol (or a memory protocol CXL.memory). In some embodiments, the CXL bus 50 may support protocols, such as peripheral component interconnection (PCI), PCI express (PCIe), universal serial bus (USB), and serial advanced technology attachment (SATA). A protocol supported by the CXL bus 50 may referred to as an interconnect protocol.

The memory controller 1100 may refer to a device that provides functions to the plurality hosts 900a, 900b, . . . , 900f. Based on the CXL specification 2.0, the memory controller 1100 may be an accelerator that supports the CXL specification. For example, at least some of computing operations and I/O operations executed in the plurality hosts 900a, 900b, . . . , 900f may be off-loaded to the memory controller 1100. In some embodiments, the each of the plurality hosts 900a, 900b, . . . , 900f may include any one or any combination of a programmable component (e.g., a graphic processing unit (GPU) and a neural processing unit (NPU), a component (e.g., an intellectual property (IP) core) that provides a fixed function and a reconfigurable component (e.g., a field programmable gate array (FPGA)).

Figure 29:
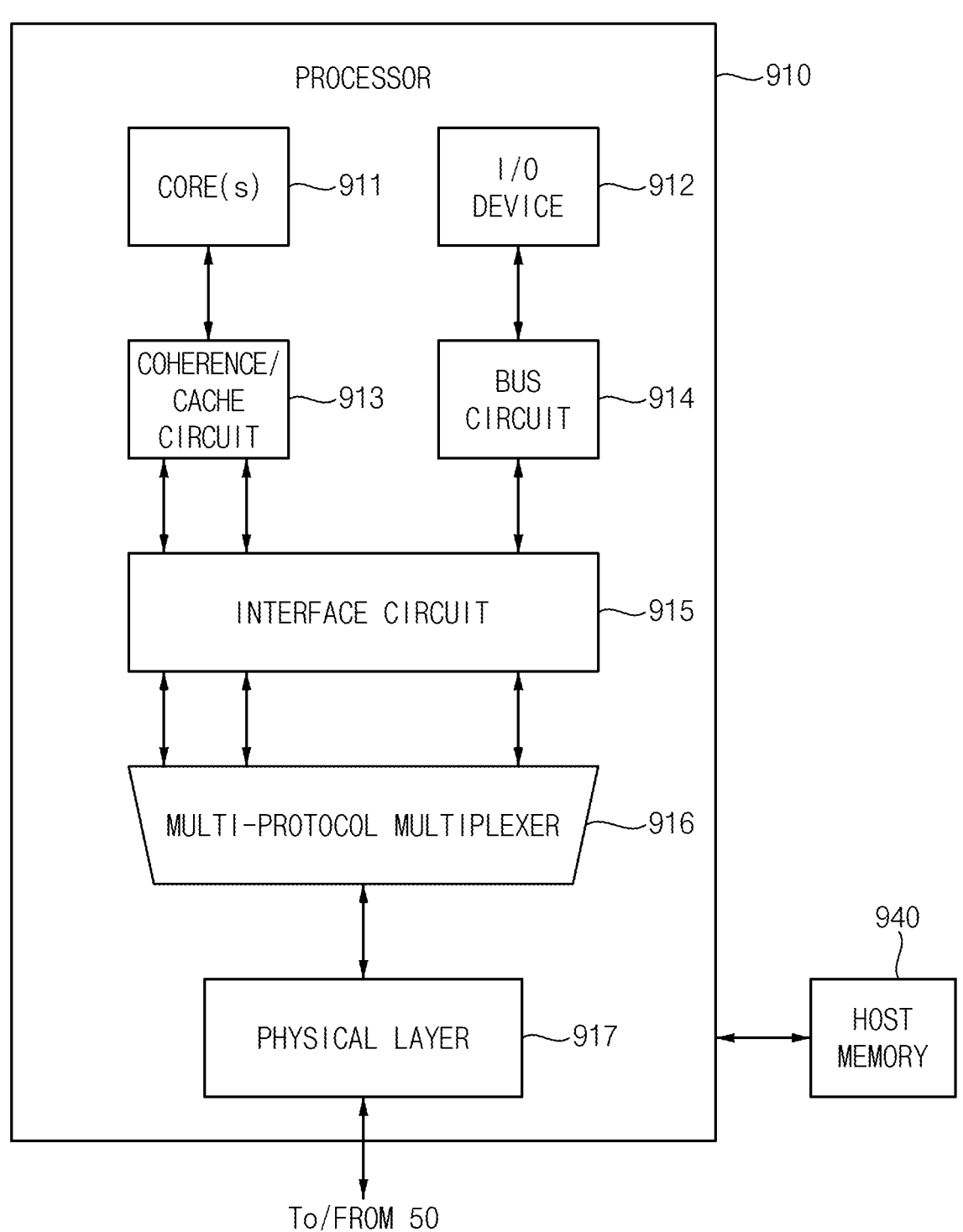
FIG. 29 is a block diagram illustrating one of the plurality hosts in the computing system of FIG. 28 according to example embodiments.

FIG. 29 is a block diagram illustrating one of the plurality hosts in the computing system of FIG. 28 according to example embodiments.

In FIG. 29, a configuration of the host 900a from among the plurality hosts 900a, 900b, . . . , 900f and each configuration of the hosts 900b, . . . , 900f may be substantially the same as the configuration of the host 900a.

Referring to FIG. 29, the host 900a may include a processor 910 and a host memory 940.

The processor 910 may be a central processing unit (CPU) of the host 900a. In some embodiments, the processor 910 may be a CXL-based processor. As illustrated in FIG. 28, the processor 910 may be connected to the host memory 940 and may include a physical layer 917, a multi-protocol multiplexer 916, an interface circuit 915, a coherence/cache circuit 913, a bus circuit 914, at least one core 911 and an I/O device 912.

The at least one core 911 may execute an instruction and be connected to the coherence/cache circuit 913. The coherence/cache circuit 913 may include a cache hierarchy and may be referred to as a coherence/cache logic. As illustrated in FIG. 28, the coherence/cache circuit 913 may communicate with the at least one core 911 and interface circuit 915. For example, the coherence/cache circuit 913 may enable communication through one or more protocols including, for example, a coherent protocol and a memory access protocol. In some embodiments, the coherence/cache circuit 913 may include a direct memory access (DMA) circuit. The I/O device 912 may be used to communicate with the bus circuit 914. For example, the bus circuit 914 may be a PCIe logic and the I/O device 912 may be a PCIe I/O device.

The interface circuit 915 may be configured to enable communication between components (e.g., the coherence/cache circuit 913 and the bus circuit 914) of the processor 910 and the memory system 1000. In some embodiments, the interface circuit 915 may be configured to enable communication between components of the processor 910 and the memory system 1000 according to a plurality of protocols (e.g., a non-coherent protocol, the coherent protocol and the memory access protocol). For example, the interface circuit 915 may be configured to determine one of the plurality of protocols based on messages and data for communication between the components of the processor 910 and the memory system 1000.

The multi-protocol multiplexer 916 may include at least one protocol queue. The interface circuit 915 may be connected to the at least one protocol queue and be configured to transmit and receive messages and/or data to and from the memory system 1000 through the least one protocol queue. In some embodiments, the interface circuit 915 and the multi-protocol multiplexer 916 may be integrally formed into one component. In some embodiments, the multi-protocol multiplexer 916 may include a plurality of protocol queues corresponding respectively to the plurality of protocols supported by the CXL bus 50. In some embodiments, the multi-protocol multiplexer 916 may arbitrate communications of different protocols and may be configured to provide selected communications the physical layer 917.

Figure 30:
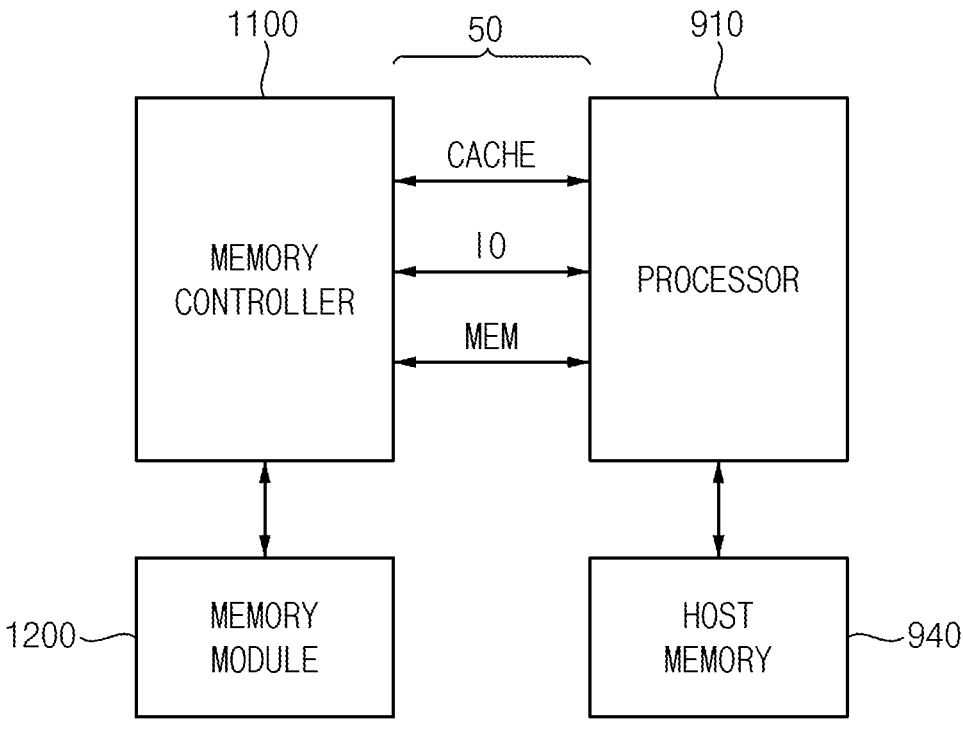
FIG. 30 illustrates an example of a multi-protocol for communication in the computing system of FIG. 28.

FIG. 30 illustrates an example of a multi-protocol for communication in the computing system of FIG. 28 according to some embodiments.

Referring to FIG. 30, the processor 910 and the memory controller 1100 may be configured to communicate with each other based on a plurality of protocols.

According to the above-mentioned CXL examples, the plurality of protocols may include a memory protocol MEM, a coherent protocol CACHE and a non-coherent protocol IO. The memory protocol MEM may define a transaction from a master to a subordinate and a transaction from the subordinate to the master. The coherent protocol CACHE may define interactions between the memory controller 1100 and the processor 910. For example, an interface of the coherent protocol CACHE may include three channels including a request, a response and data. The non-coherent protocol IO may provide a non-coherent load/store for I/O devices.

The memory controller 1100 may communicate with the memory module 1200 and the processor 910 may communicate with the host memory 940.

Figure 31:
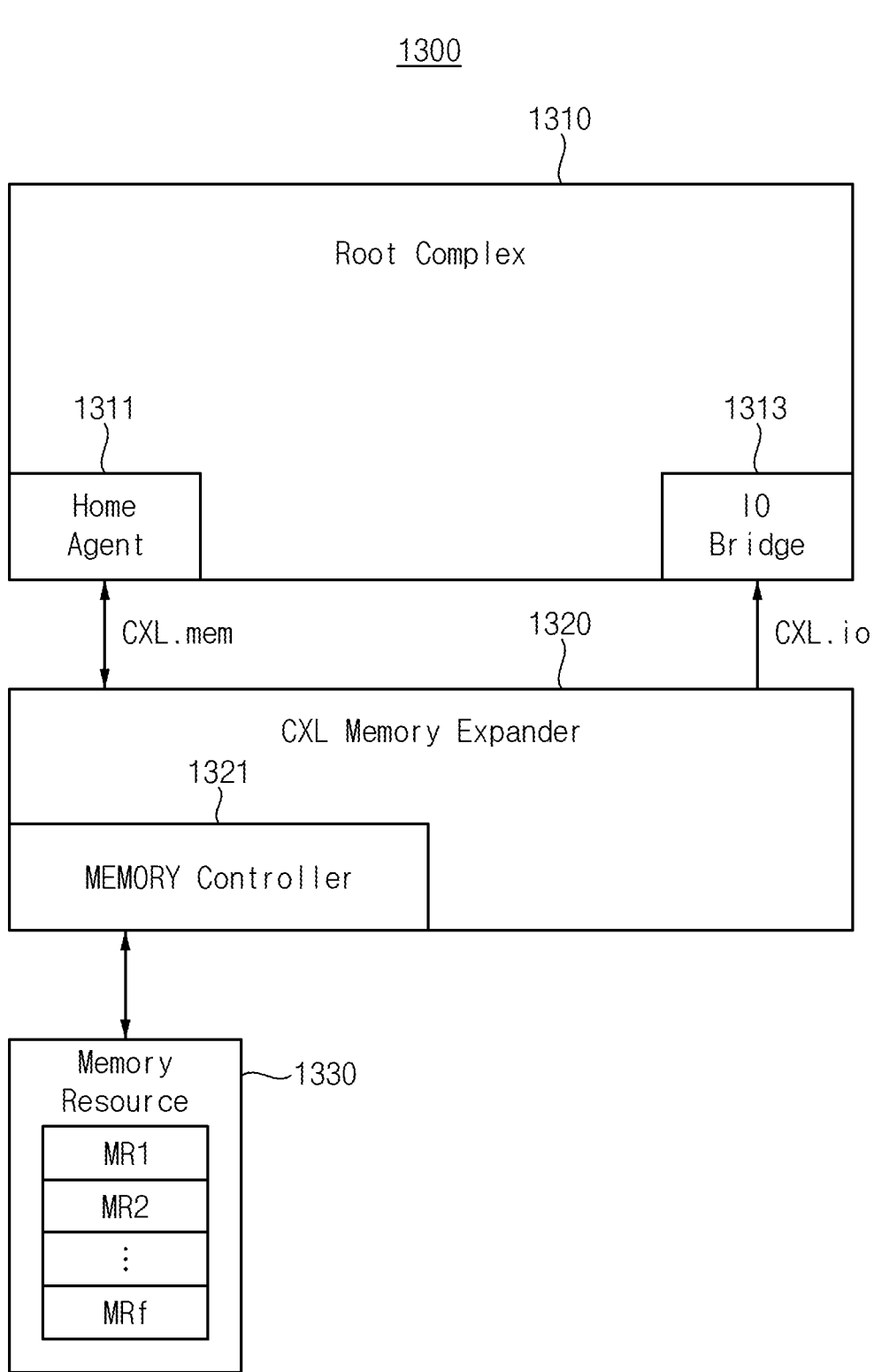
FIG. 31 is an example of a computing system when a memory system according to example embodiments corresponds to a Type 3 memory system defined by a CXL protocol.

FIG. 31 is an example of a computing system when a memory system according to example embodiments corresponds to a Type 3 memory system defined by a CXL protocol.

Referring to FIG. 31, a computing system 1300 may include a root complex 1310, a CXL memory expander 1320 connected to the root complex 1310 and a memory resource 1330.

The root complex 1310 may include a home agent 1311 and an I/O bridge 1313, and the home agent 1310 may be configured to communicate with the CXL memory expander 1320 based on a coherent protocol CXL.mem the I/O bridge 1313 may be configured to communicate with the CXL memory expander 1320 based on a non-coherent protocol, i.e., an I/O protocol CXL.io. In a CXL protocol base, the home agent 1310 may correspond to an agent on a host side that is arranged to solve the entire consistency of the computing system 1300 for a given address.

The CXL memory expander 1320 may include a memory controller 1321 and the smart controller 1321 may use the memory controller 1100 of FIG. 28.

In addition, the CXL memory expander 1320 may output data to the root complex 1310 via the I/O bridge 1313 based on the I/O protocol CXL.io or the PCIe.

The memory resource 1330 may include a plurality of memory regions MR1, MR2, . . . , MRf and each of the plurality of memory regions MR1, MR2, . . . , MRf may be implemented as a memory of a various units.

Figure 32:
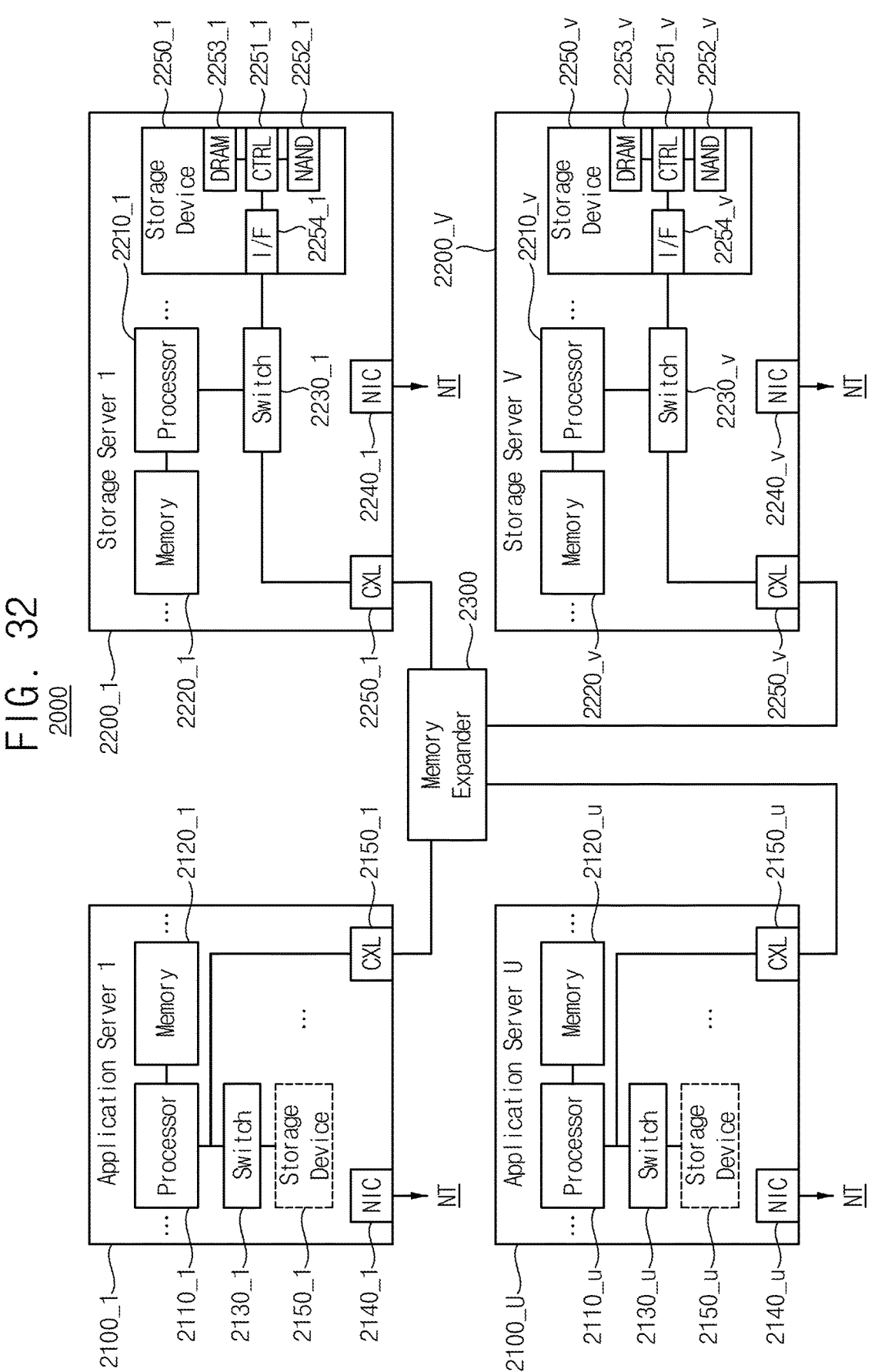
FIG. 32 is a block diagram illustrating a data center including a computing system according to example embodiments.

FIG. 32 is a block diagram illustrating a data center including a computing system according to example embodiments.

Referring to FIG. 32, a data center 2000 may be a facility that collects various types of data and provides various services, and may be referred to as a data storage center. The data center 2000 may be a system for operating search engines and databases, and may be a computing system used by companies such as banks or government agencies. The data center 2000 may include application servers 2100_1 to 2100_U and storage servers 2200_1 to 2200_V. The number of the application servers 2100_1 to 2100_U and the number of the storage servers 2200_1 to 2200_V may be variously selected according to example embodiments, and the number of the application servers 2100_1 to 2100_U and the number of the storage servers 2200_1 to 2200_V may be different from each other.

Below, for convenience of description, an example of the storage server 2200_1 will be described.

The storage server 2200_1 may include a processor 2210_1, a memory 2220_1, a switch 2230_1, a network interface controller (NIC) 2240_1, a storage device 2250_1 and CXL interface 2250_1. The storage server 2200_V may include a processor 2210_v, a memory 2220_v, a switch 2230_v, a NIC 2240_v, a storage device 2250_v and CXL interface 2250_v.

The processor 2210_1 may be configured to control overall operation of the storage server 2200_1. The memory 2220_1 may be configured to store various instructions or data under control of the processor 2210_1. The processor 2210_1 may be configured to access the memory 2220_1 to execute various instructions or to process data. In an embodiment, the memory 2220_1 may include at least one of various kind of memory devices such as double data rate synchronous DRAM (DDR SDRAM), high bandwidth memory (HBM), hybrid memory cube (HMC), dual in-line memory module (DIMM), Optane DIMM or non-volatile DIMM.

In an embodiment, the number of the processors 2210_1 included in the storage server 2200_1 and the number of the memories 2220_1 included in the storage server 2200_1 may be variously changed or modified. In an embodiment, the processor 2210_1 and the memory 2220_1 included in the storage server 2200_1 may constitute a processor-memory pair and the number of processor-memory pairs included in the storage server 2200_1 may be variously changed or modified. In an embodiment, the number of the processors 2210_1 included in the storage server 2200_1 and the number of the memories 2220_1 included in the storage server 2200_1 may be different. The processor 2210_1 may include a single core processor and a multi-core processor.

Under control of the processor 2210_1, the switch 2230_1 may be configured to selectively connect the processor 2210_1 and the storage device 2250_1 or may be configured to selectively connect the NIC 2240-1, the storage device 2250_1 and the CXL 2240_1.

The NIC 2240_1 may connect the storage server 2220_1 with a network NT. The NIC 2240_1 may include a network interface card, a network adapter, and the like. The NIC 2240_1 may be connected to the network NT through a wired interface, a wireless interface, a Bluetooth interface, or an optical interface. The NIC 2240_1 may include an internal memory, a digital signal processor (DSP), a host bus interface, and the like and may be connected with the processor 2210_1, or the switch 2230_1 through the host bus interface. The host bus interface may include at least one of various interface schemes, such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multimedia card (MMC) interface, an embedded MMC (eMMC) interface, a universal flash storage (UFS) interface, an embedded UFS (eUFS) interface, a compact flash (CF) card interface, etc. In an embodiment, the NIC 2240_1 may be integrated with at least one of the processor 2210_1, the switch 2230_1 and the storage device 2250_1.

Under control of the processor 2210_1, the storage device 2250_1 may be configured to store data or may be configured to output the stored data. The storage device 2250_1 may include a controller CTRL 2251_1, a nonvolatile memory NAND 2252_1, a DRAM 2253_1 and an interface I/F 2254_1. In an embodiment, the storage device 2250_1 may further include a secure element SE for security or privacy. The storage device 2250_v may include a controller CTRL 2251_v, a nonvolatile memory NAND 2252_v, a DRAM 2253_v and an interface I/F 2254_v. In an embodiment, the storage device 2250_v may further include a secure element SE for security or privacy.

The controller 2251_1 may be configured to control overall operation of the storage device 2250_1. The controller 2251_1 may include an SRAM. In response to signals received through the interface 2254_1, the controller 2251_1 may be configured to store data in the nonvolatile memory 2252_1 or may be configured to output data stored in the nonvolatile memory 2252_1. The controller 2251_1 may be configured to control the nonvolatile memory 2252_1 based on a toggle interface or an ONFI.

The DRAM 2253_1 may be configured to temporarily store data to be stored in the nonvolatile memory 2252_1 or data read from the nonvolatile memory 2252_1. The DRAM 2253_1. The DRAM 2253_1 may be further configured to store various data (e.g., metadata and mapping data) used by the controller 2251_1 to facilitate operation thereof. The interface 2254_1 may provide a physical connection between the controller 2251_1 and the processor 2210_1, the switch 2230_1 or the NIC 2240_1. The interface 2254_1 may be implemented to support direct-attached storage (DAS) manner that allows the direct connection of the storage device 2250_1 through a dedicated cable. The interface 2254_1 may be implemented based on at least one of various above-described interfaces through a host interface bus.

The above components of the storage server 2200_1 are provided as an example, and embodiments of the present disclosure are not limited thereto. The above components of the storage server 2200_1 may be applied to each of the other storage servers or each of the application servers 2100_1 to 2100_U. In each of the application servers 2100_1 to 2100_U, a storage device 2150_1 may be selectively omitted.

The application server 2100_1 may include a processor 2110_1, a memory 2120_1, a switch 2130_1, a NIC 2140_1, and CXL interface 2160_1. The application server 2100_U may include a processor 2110_u, a memory 2120_u, a switch 2130_u, a NIC 2140_1, and CXL interface 2160_u.

The application servers 2100_1 to 2100_U and the storage servers 2200_1 to 2200_V may communicate with each other through the network NT. The network NT may be implemented using a fiber channel (FC) or an Ethernet. The FC may be a medium used for a relatively high speed data transmission, and an optical switch that provides high performance and/or high availability may be used. The storage servers 2200_1 to 2200_V may be provided as file storages, block storages or object storages according to an access scheme of the network NT.

In some example embodiments, the network NT may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network NT may be a general network such as the TCP/IP network. For example, the network NT may be implemented according to at least one of protocols such as an FC over Ethernet (FCOE), a network attached storage (NAS), a nonvolatile memory express (NVMe) over Fabrics (NVMe-oF), etc.

In example embodiments, at least one of the plurality of application servers 2100_1 to 2100_U may be configured to access at least one of the remaining application servers or at least one of the storage servers 2200_1 to 2200_V over the network NT.

For example, the application server 2100_1 may be configured to store data requested by s user or a client in at least one of the storage servers 2200_1 to 2200_V over the network NT. In other embodiments, the application server 2100_1 may obtain data requested by s user or a client in at least one of the storage servers 2200_1 to 2200_V over the network NT. In this case, the application server 2100_1 may be implemented with a web server, a database management system (DBMS), or the like.

The application server 2100_1 may be configured to access a memory 2120_1 or a storage device 2105_1 of the application server 2100_1 or the storage device 2250_1 of the storage server 2000_1 over the network NT. As such, the application server 2100_1 may perform various operations on data stored in the application servers 2100_1 to 2100_U and/or the storage servers 2200_1 to 2200_V. For example, the application server 2100_1 may execute a command for moving or copying data between the application servers 2100_1 to 2100_U and/or the storage servers 2200_1 to 2200_V. The data may be transferred from the storage devices 2250_1 to 2250_v of the storage servers 2200_1 to 2200_V to the memories 2120_1 to 2120_u of the application servers 2100_1 to 2100_U directly or through the memories 2220_1 to 2220_v of the storage servers 2200_1 to 2200_V. For example, the data transferred through the network NT may be encrypted data for security or privacy.

The storage servers 2200_1 to 2200_V and the application servers 2100_1 to 2100_U may be connected with a memory expander 2300 through the CXL interfaces 2260_1 to 2260_v and 2160_1 to 2160_u. The memory expander 2300 may be used as expanded memory of each of the storage servers 2200_1 to 2200_V and the application servers 2100_1 to 2100_U or virtualized component included therein may communicate with each other through the CXL interfaces 2260_1 to 2260_v and 2160_1 to 2160_u and the memory expander 2300.

The present disclosure may be applied to various electronic devices and systems that include memory modules and memory systems. For example, the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

While the present disclosure has been particularly shown and described with reference to the example embodiments thereof, it will be understood by those of ordinary skill in the art that various changes in form and detail may be made therein without departing from the spirit and scope of the present disclosure as defined by the following claims.

What is claimed is:

1. A memory controller including a processor and configured to control a memory module including a plurality of data chips and at least one parity chip, the memory controller comprising:

an error correction code (ECC) engine, the ECC engine including an ECC decoder configured to correct Q symbol errors in a codeword set read from the memory module, Q being a maximum natural number equal to or less than P, P being a natural number equal to or greater than four;

wherein the ECC decoder is configured to:

generate a syndrome including first through P-th syndrome symbols based on the read codeword set by using a parity check matrix; and perform a first ECC decoding to correct a single symbol error in the read codeword set based on the first syndrome symbol and a selected syndrome symbol corresponding to one of the second through P-th syndrome symbols; and wherein the ECC decoder includes a single symbol correction circuit configured to:

estimate an error magnitude and a position of a target symbol in which an error exists based on the first syndrome symbol and the selected syndrome symbol;

correct an error of the target symbol based on the estimated position of the target symbol; and verify whether the error is corrected.

2. The memory controller of claim 1, wherein the ECC decoder further comprises:

a syndrome generator configured to generate the syndrome by performing a matrix-multiplication of the read codeword set with a transportation matrix of the parity check matrix.

3. The memory controller of claim 2, wherein the single symbol correction circuit comprises:

an error magnitude and symbol position estimator configured to estimate the first syndrome symbol as the error magnitude and configured to estimate position information of a target matrix element as the position of the target symbol, the target matrix element corresponding to a ratio of the selected syndrome symbol to the first syndrome symbol in a selected row corresponding to the selected syndrome symbol, from among a plurality of rows in the transposition matrix;

a single symbol error corrector configured to generate a corrected target symbol by adding the first syndrome symbol to an estimated target symbol corresponding to the selected syndrome symbol, from among a plurality of symbols in the read codeword set; and an error correction checker configured to generate a check syndrome by performing a matrix-multiplication on a codeword set including the corrected target symbol and the transposition matrix and configured to determine whether the first ECC decoding is successful based on check syndrome symbols of the check syndrome.

4. The memory controller of claim 3, wherein the error magnitude and symbol position estimator is configured to determine that the first ECC decoding fails in response to the target matrix element corresponding to the ratio of the selected syndrome symbol to the first syndrome symbol not existing in the selected row.

5. The memory controller of claim 3, wherein the error correction checker is configured to determine that the first ECC decoding is successful in response to the check syndrome symbols being all zero.

6. The memory controller of claim 3, wherein the error correction checker is configured to determine that the first ECC decoding fails in response to at least one of the check syndrome symbols being non-zero.

7. The memory controller of claim 2, wherein the single symbol correction circuit is configured to generate a decoding flag indicating whether the first ECC decoding is successful, and wherein the ECC decoder further comprises:

a multi symbol correction circuit configured to correct multi symbol errors in the read codeword set by using the first through P-th syndrome symbols and operate in parallel with the single symbol correction circuit; and a control logic configured to selectively terminate an operation of the multi symbol correction circuit based on the decoding flag.

8. The memory controller of claim 7, wherein the control logic is configured to terminate an operation of the multi symbol correction circuit in response to the decoding flag indicating that the first ECC decoding is successful.

9. The memory controller of claim 7, wherein the multi symbol correction circuit comprises:

a Berlekamp-Massey (BM) calculator configured to generate coefficients of an error locator polynomial by performing P iterations based on the first through P-th syndrome symbols;

a chien search block configured to search positions of symbol errors based on the coefficients of the error locator polynomial;

an error value estimator configured to estimate error values based on the positions of the symbol errors; and a multi symbol error corrector configured to correct the multi symbol errors based on the estimated error values.

10. The memory controller of claim 1, wherein the ECC decoder further comprises a multi symbol correction circuit configured to operate when the first ECC decoding fails, and wherein the multi symbol correction circuit is configured to perform a second ECC decoding to correct multi symbol errors in the read codeword set based on the first through P-th syndrome symbols.

11. The memory controller of claim 1, wherein the ECC decoder further comprises:

a syndrome generator configured to generate the syndrome by performing a matrix-multiplication on the read codeword set with a transposition matrix of the parity check matrix; and wherein the single symbol correction circuit is further configured to:

estimate an error magnitude and a position of a target symbol in which an error exists based on the first syndrome symbol and the selected syndrome symbol;

generate an estimated syndrome based on the first syndrome symbol and the estimated position of the target symbol; and correct the error of the target symbol based on comparison of the estimated syndrome symbols and the syndrome symbols.

12. The memory controller of claim 11, wherein the single symbol correction circuit comprises:

an error magnitude and symbol position estimator configured to estimate the first syndrome symbol as the error magnitude and configured to search a target matrix corresponding to a ratio of the selected syndrome symbol to the first syndrome symbol in a selected row corresponding to the selected syndrome symbol, from among a plurality of rows in the transposition matrix;

an estimated syndrome generator configured to generate second through P-th estimated syndrome symbols based on a target matrix element, of the target matrix, and the first syndrome symbol;

a syndrome comparator configured to generate a comparison signal by comparing the second through P-th syndrome symbols with the second through P-th estimated syndrome symbols, respectively; and a single symbol error corrector configured to selectively correct an error of the target symbol based on the comparison signal.

13. The memory controller of claim 12, wherein the single symbol error corrector is, in response to each of the second through P-th syndrome symbols matching respective one of the second through P-th estimated syndrome symbols, configured to generate a corrected target symbol by adding the first syndrome symbol to the target symbol corresponding to the selected syndrome symbol, from among a plurality of symbols in the read codeword set.

14. The memory controller of claim 12, wherein the syndrome comparator is configured to determine that the first ECC decoding fails in response to at least one pair of the second through P-th syndrome symbols and the second through P-th estimated syndrome symbols, respectively, not matching each other.

15. The memory controller of claim 11, wherein the single symbol correction circuit is configured to generate a decoding flag indicating whether the first ECC decoding is successful, and wherein the ECC decoder further comprises:

a multi symbol correction circuit configured to correct multi symbol errors in the read codeword set by using the first through P-th syndrome symbols and to operate in parallel with the single symbol correction circuit; and a control logic configured to selectively terminate an operation of the multi symbol correction circuit based on the decoding flag.

16. The memory controller of claim 11, wherein the ECC decoder further comprises a multi symbol correction circuit configured to operate when the first ECC decoding fails, and wherein the multi symbol correction circuit is configured to perform a second ECC decoding to correct multi symbol errors in the read codeword set based on the first through P-th syndrome symbols.

17. A memory system comprising:

a memory module that includes a plurality of data chips and at least one parity chip; and a memory controller including a processor and configured to control the memory module, wherein the memory controller includes:

an error correction code (ECC) engine, the ECC engine including an ECC decoder configured to correct Q symbols errors in a codeword set read from the memory module, Q being a maximum natural number equal to or less than P, P being a natural number equal to or greater than four;

wherein the ECC decoder is configured to:

generate a syndrome including first through P-th syndrome symbols based on the read codeword set by using a parity check matrix;

correct a single symbol error in the read codeword set by performing a first ECC decoding to estimate an error magnitude and a position of a target symbol in which an error exists based on the first syndrome symbol and a selected syndrome symbol corresponding to one of the second through P-th syndrome symbols;

correct an error of the target symbol based on the estimated position of the target symbol; and verify whether the error is corrected.

18. The memory system of claim 17, wherein the ECC decoder is configured to generate a decoding flag indicating whether the first ECC decoding is successful, and wherein the ECC decoder further comprises:

a multi symbol correction circuit configured to correct multi symbol errors in the read codeword set by using the first through P-th syndrome symbols and to operate in parallel with a single symbol correction circuit; and a control logic configured to selectively terminate an operation of the multi symbol correction circuit based on the decoding flag.

19. The memory system of claim 17, wherein the memory controller is configured to control the memory module by communicating with one or hosts host through a compute express link (CXL) interface.

20. A memory controller including a processor and configured to control a memory module including a plurality of data chips and at least one parity chip, the memory controller comprising:

an error correction code (ECC) engine, the ECC engine including an ECC decoder configured to correct Q symbols errors included a codeword set read from the memory module, Q being a maximum natural number equal to or less than P, P being a natural number equal to or greater than four; and wherein the ECC decoder is configured to:

generate a syndrome including first through P-th syndrome symbols based on the read codeword set by using a parity check matrix; and correct a single symbol error in the read codeword set by performing an ECC decoding to estimate an error magnitude and a position of a target symbol in which an error exists based on the first syndrome symbol and a selected syndrome symbol corresponding to one of the second through P-th syndrome symbols;

correct an error of the target symbol based on the estimated position of the target symbol; and verify whether the error is corrected.

* * * * *